(12) United States Patent
Johansson et al.

(10) Patent No.: US 7,450,577 B2
(45) Date of Patent: *Nov. 11, 2008

(54) FLEXIBLE INTER-NETWORK COMMUNICATION SCHEDULING

(75) Inventors: Per Johansson, Hägersten (SE); Ulf Jönsson, Huddinge (SE); Fredrik Alriksson, Solna (SE); Niklas Johansson, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 81 days.

This patent is subject to a terminal disclaimer.

(21) Appl. No.: 11/279,686

(22) Filed: Apr. 13, 2006

(65) Prior Publication Data

US 2006/0183423 A1     Aug. 17, 2006

Related U.S. Application Data

(63) Continuation of application No. 09/994,803, filed on Nov. 28, 2001, now Pat. No. 7,058,050.

(60) Provisional application No. 60/250,149, filed on Dec. 1, 2000.

(51) Int. Cl.
*H04L 12/50* (2006.01)
*H04Q 11/00* (2006.01)
(52) U.S. Cl. ................. 370/386; 370/401; 709/226
(58) Field of Classification Search ................ 370/315, 370/338, 349, 235, 231, 328, 468, 390, 432, 370/386, 474, 401, 344, 389, 319, 352, 392; 709/235, 226, 237, 228; 455/41.2, 41; 379/88, 379/93, 90, 900; 725/112, 87, 86
See application file for complete search history.

(56) References Cited

U.S. PATENT DOCUMENTS 5,598,417 A     1/1997  Crisler et al.

(Continued)

FOREIGN PATENT DOCUMENTS

EP     0999717 A2     5/2000

(Continued)

OTHER PUBLICATIONS

European Search Report, dated Jun. 28, 2001, in connection with U.S. Appl. No. 60/250,149.

(Continued)

*Primary Examiner*—Wing F. Chan
*Assistant Examiner*—Prenell P Jones
(74) *Attorney, Agent, or Firm*—Potomac Patent Group PLLC

(57) ABSTRACT

Systems and methods are provided for managing communications between two or more ad-hoc networks in a communication system. The systems and methods may have flexible communication time sharing of one or more nodes taking part in two or more ad-hoc networks. For example, the communication scheduling function for a node shared by two or more ad-hoc networks is provided with a generic functional architecture such that it may be located in a number of different locations. In one embodiment, a Bluetooth communication system includes an inter-piconet scheduling function having a JUMP mode introduced to distinctly identify a node to its neighbors as being shared with multiple ad-hoc networks. The jump mode may have one or more methods for managing the inter-network communications that may include: (1) predetermined fixed starting point and length communication windows, (2) time points with flexible starting points and communication window length, and/or (3) random starting time and length communication windows.

17 Claims, 13 Drawing Sheets

U.S. PATENT DOCUMENTS

| | | | |
|---|---|---|---|
| 5,949,776 | A | 9/1999 | Mahany et al. |
| 6,026,297 | A | 2/2000 | Haartsen |
| 6,480,505 | B1 | 11/2002 | Johansson et al. |
| 6,590,928 | B1 | 7/2003 | Haartsen |
| 6,618,377 | B1 | 9/2003 | Miriyala |
| 6,718,533 | B1 | 4/2004 | Schneider et al. |
| 6,735,448 | B1 | 5/2004 | Krishnamurthy et al. |
| 6,751,200 | B1 | 6/2004 | Larsson et al. |
| 6,850,965 | B2 | 2/2005 | Allen |
| 7,024,482 | B2 * | 4/2006 | Hlasny ............ 709/227 |
| 7,058,050 | B2 * | 6/2006 | Johansson et al. ........ 370/386 |
| 2001/0003191 | A1 | 6/2001 | Kovacs et al. |
| 2002/0150145 | A1 | 10/2002 | Alriksson et al. |
| 2002/0176412 | A1 * | 11/2002 | Racz et al. ............ 370/389 |
| 2003/0012173 | A1 * | 1/2003 | Rune .................. 370/344 |
| 2004/0095907 | A1 | 5/2004 | Agee et al. |
| 2004/0196784 | A1 | 10/2004 | Larsson et al. |

FOREIGN PATENT DOCUMENTS

| | | |
|---|---|---|
| WO | WO 99/29126 A1 | 6/1999 |
| WO | WO 00/69186 A1 | 11/2000 |
| WO | WO 01/41348 A2 | 6/2001 |

OTHER PUBLICATIONS

PCT International Search Report, dated Dec. 19, 2002, in connection with International Application No. PCT/SE01/02651.

Haijun Luo et al; A topology-independent fair queueing model in ad hoc wireless networks Network Protocols, 2000. Proceedings. 2000 International Conference on, Nov. 14-17, 2000 pp. 325-335.

Chang et al.; Routing in wireless/mobile ad-hoc via dynamic group construction; Mobile Networks and Application archives, vol. 5, Issue 1 (Mar. 2000) table of contents pp. 27-37.

K.Y. Eng, M.J. Karol, M. Veeraraghavan, E. Ayanoglu, C.B. Woodworth, P. Pancha, R.A. Valenzuela; A wireless broadband ad-hoc ATM local-area network; Feb. 1995. Wireless Networks, vol. 1 Issue 2 pp. 161-174.

Ayyagari, D. et al; A unified approach to scheduling, access control and routing for ad-hoc wireless networks; Vehicular Technology Conference Proceedings, 2000. VTC 2000-Spring Tokyo, 2000 IEEE 51st vol. 1. May 15-18, 2000 page(s).

* cited by examiner

FLEXIBLE INTER-NETWORK COMMUNICATION SCHEDULING

CROSS-REFERENCE TO RELATED APPLICATIONS

The present application is a continuation of U.S. application Ser. No. 09/994,803, filed Nov. 28, 2001 now U.S. Pat. No. 7,058,050, which claims the benefit of provisional U.S. Patent Application Ser. No. 60/250,149, filed Dec. 1, 2000, the complete disclosures of which are hereby incorporated herein by reference for all purposes.

FIELD OF THE INVENTION

The present invention pertains to systems and methods of communicating in polling based communication infrastructure in an ad-hoc network. In particular, the invention involves systems and methods for inter-network communication management.

BACKGROUND

Traditional communication networks are commonly designed according to a hierarchical architecture. User communication accesses the network via a source node and is routed through dedicated equipment in the network to a destination node. For example, in a wireless communication network including a cellular phone a user may originate a communication session by dialing the telephone number of a desired destination. The user's call is received in a base transceiver station (BTS), where it is typically transferred across a wire line network to the destination. Of course, if the destination is also a wireless remote terminal (e.g., a cellular phone) then the call is routed to a BTS in the cell in which the destination phone resides at the time. The BTS transmits the user communication across the wireless interface to the cellular phone. It will be appreciated that the remote terminals may include data terminals such as, for example, Personal Computers (PC's), Personal Digital Assistants (PDAs), printers, or other terminals capable of transmitting and receiving data packets.

Hierarchical communication networks represent an inefficient use of the radio spectrum in circumstances which the remote terminals are sufficiently close together that they could communicate directly. Establishing a connection through the network requires that two links (e.g., radio channels) be established and consumes resources of at least three radio units (e.g., two remote terminals and a BTS) in the session when only a single link or channel would be required if the terminals could communicate directly with one another. Thus, forcing the communication session through the network reduces the network capacity by at least a factor of two. To make better use of network resources, and thereby improve network efficiency, remote terminals should communicate directly with other terminals, if possible.

Ad-hoc communication networks attempt to address this situation by providing remote terminals with the capability to form direct connections with one another, without the assistance of an intervening communication network. Wireless systems that support ad-hoc connections should provide direct communication among any radio units that are in range of one another. For example, one electronic device (e.g., a desktop PC, a laptop PC, a PDA, a mobile telephone, a printer, a web pad, etc.) should be able to directly communicate with another electronic device (e.g., a desk top PC, laptop PC, mobile telephone, etc.) via radio communication without the need for any other intervening network equipment, as long as the radio transceivers are within range of one another. Such a wireless systems may be used to replace cables or infrared links, e.g., between a computer and a printer, with a short-range radio link (a wireless link) forming a local radio network.

One such ad-hoc communication network recently developed is known as Bluetooth. Bluetooth is a polling based communication infrastructure that may be used for the wireless communication of digital information (e.g., data, voice, video, audio, etc.) between devices using an open specification. Bluetooth may be understood as a wireless personal area network (PAN) technology for short-range transmission of digital information between various electronic devices (e.g., laptops, PDAs, telephones, desktop PCs, printers, facsimiles, etc.) that can interconnect two or more devices in one or more ad-hoc networks. Bluetooth supports point-to-point and multipoint applications and is described in further detail in the *Bluetooth Baseband Specification* 1.1 by the Bluetooth Special Interest Group (SIG), which is expressly incorporated by reference in its entirety.

The emergence of Bluetooth as a default radio interface in various types of devices provides an opportunity to turn them from stand-alone tools into networked equipment without the need for wired connections or added network devices, such as a BTS, server, router, etc. Bluetooth offers a number of advantages over conventional wireless technologies for communicating between individual electronic devices. For example, unlike conventional infrared data transmission techniques which require line-of-sight between devices, Bluetooth uses omni-directional radio waves that can transmit through walls and other non-metal barriers. Further, infrared communication techniques often were limited to communication between only two devices at a time, requiring a change in the physical alignment of devices for a different pair of devices to communicate. With the use of omni-directional radio and multiplexing of the radio signal, Bluetooth enables communication between more than two electronic devices without changing the physical orientation of the devices. In addition, a device that works in accordance with Bluetooth may also connect in a similar manner to any type of radio communication network, such as cellular networks, satellite or small local radio networks. (See, for example, PCT Published Patent Application WO 00/69186, which is hereby incorporated by reference.) Further, to counteract interference from outside sources or from other devices, Bluetooth units may downgrade the transmission rate instead of halting transmissions altogether. However there are a number of new challenges associated with using Bluetooth technology for ad-hoc network communications, partly stemming from the fact that Bluetooth was originally developed for single hop wireless connections.

Bluetooth systems, in accordance with the *Bluetooth Baseband Specification* 1.1, use short range radio technology operating in the unlicensed 2.4 GHz Industrial-Scientific-Medical (ISM) band using a frequency hopping scheme. The IEEE 802.11 is another example of a specification utilizing the ISM band. The Bluetooth hopping scheme is performed on 79 RF channels spaced 1 MHz apart using a frequency hopping spread spectrum technique that changes its signal 1600 times per second. A frequency hop transceiver is applied to combat interference and fading. Bluetooth provides considerable data transfer capability at short ranges; e.g., up to approximately 720 Kbps within approximately 10 meters and up to approximately 100 meters with a power boost The Bluetooth system provides full-duplex transmission based on slotted Time Division Duplex (TDD) scheme, where each slot is approximately 0.625 ms long.

An exemplary Bluetooth piconet in its simplest form is shown in FIG. 1. Bluetooth (BT) units are organized into "piconets" which are collections of devices connected in an ad-hoc fashion. Two or more units sharing the same radio channel form a piconet. Bluetooth piconets are "ad-hoc" in that Bluetooth units are free to enter and leave, that is, the piconets are not fixed networks. A piconet is initially formed when two or more devices (e.g., devices 110 and 120) connect via a radio communication transmission, each device herein referred to as "nodes". One Bluetooth device in each piconet may act as the master, and a master node can have any number of slaves, out of which, for example, up to seven can be active simultaneously, i.e., seven units are able to send and receive data within the piconet if a 3-bit active member address (AM ADDR) is used. In Bluetooth all units are peer units with identical hardware and software interfaces, i.e. being a master or slave is only a logical state. The piconet in the figure has one master node, BT 110 (shown with cross hatching), and one slave node, BT 120. A "master" is the device in a piconet whose clock and hopping sequence are used to sequence other devices in the piconet. A "slave" is any other device in the piconet. The terms "master" and "slave" are defined as logical states, in that a particular Bluetooth device can be a master or a slave. In fact, a Bluetooth unit can simultaneously be a master in one piconet and a slave in one or more other piconets. Any Bluetooth device can become a master, but only one master may exist in a given piconet at one time. It is often the radio unit that initiates the connection that acts as the master unit. Any radio unit may change its role from a slave to a master or a master to a slave.

FIG. 2 illustrates a piconet with a master node 210 and a plurality of slave nodes 220-280 arranged in a star network topology. In a Bluetooth system, a slave node can only communicate directly with its master node. If slave node 220 wishes to communicate with slave node 260, slave node 220 would have to transmit the information it wished to communicate to master node 210. Master node 210 would then transmit the information to slave node 260. Although, as an alternative, the two slaves 220 and 260 could communicate with each other if one of the slaves acts as a master. In addition to being classified as a master node and slave node, a node may be classified as various types of nodes or modes depending on its operation or operating status. For example, a node may be designated an idle node. An idle node is a node which is not currently participating in or connected to a piconet (i.e., not actively connect to any other node in the piconet). Such a node is operating in a "stand by" mode since it is not currently participating in the piconet although it is associated with the piconet. A node that is participating in a piconet is connected to another node in the piconet and would be operating in the active mode. A node that is idle is not connected to any other node in the piconet and is operating in the standby mode. However, if a node is an interpiconet node (i.e., a member of more than one piconet), the node may be currently participating in one of its piconets, while still being connected in all its piconets. A more extensive discussion of various available modes will be provided later.

The communication within a piconet is organized by a master using an intra-piconet scheduling scheme. The master polls each slave according to some polling scheme. Master-to-slave transmissions always start in an even-numbered time slot, while slave-to-master transmissions always start in an odd-numbered time slot. A "frame" includes a pair of corresponding adjacent master-to-slave and slave-to-master slots. A master has frames which are in common with those of its slaves since a master's clock and hopping sequence are used to sequence its slaves. A slave is only allowed to transmit in the current slave-to-master slot if it has been polled by the master in the previous master-to-slave slot. The master may or may not include data in the packet used to poll a slave. Bluetooth packets can be, for example, one, three or five slots long and they can carry synchronous data (e.g., real-time traffic such as voice data) on Synchronous Connection Oriented (SCO) links. Bluetooth packets can also be used to communicate asynchronous data (e.g., elastic data traffic which tend to be less sensitive to delays) on Asynchronous Connectionless (ACL) links. Depending on the type of packet that is used, an acknowledgment and retransmission scheme may be used (typically not for SCO packets transferring synchronous data) to ensure reliable data transfer, as well as forward error correction (FEC) in the form of channel coding.

Each Bluetooth unit (e.g., mobile phone, PC, printer) has a globally unique 48 bit IEEE 802 address. This address, called the Bluetooth Device Address (e.g., BD_ADDR) is initially assigned at the time the Bluetooth unit is manufactured. In addition, the master of a piconet assigns a local active member address (e.g., AM_ADDR) to each active member of the piconet. The AM_ADDR, which is only three bits long, is dynamically assigned and de-assigned and is unique only within a single piconet. The master uses the AM_ADDR when polling a slave in a piconet However, when the slave, triggered by a packet from the master addressed with the slave's AM_ADDR, transmits a packet to the master, it includes: its own AM_ADDR (not the masters) in the packet header.

Several piconets can be established and linked together in an ad-hoc fashion, forming a "scatternet" in which each piconet is characterized by a different frequency hopping sequence. Scatternets are formed when at least one Bluetooth unit participates in more than one piconet at the same time so as to connect multiple independent and unsynchronized piconets having inter-communications. FIG. 3 depicts an exemplary "scatternet" 300 comprising piconet 1 (315), piconet 2 (325) and piconet 3 (335). A Bluetooth unit (master or slave) can participate in (e.g., belong to, or be a member of) more than one piconet at any time, but it can be a master in only one piconet according to the present Bluetooth specification. A unit (or node) that simultaneously belongs, or may belong, to more than one piconet may be referred to as a Participant in Multiple Piconets (PMP) node (e.g., nodes 340 and 380). Since most Bluetooth units have only one transceiver, most PMPs can be active (i.e., be prepared to transmit or receive data) in only one piconet at a single point in time and must switch between piconets on a time division basis. That is, a PMP switches back and forth between piconets to communicate in one or the other, hence abiding by the premise that a Bluetooth unit with a single transceiver can transmit or receive in only one piconet at a single point in time. Thus, a PMP is in an "active mode" in a first piconet if it is prepared to transmit or receive data from a node the first piconet and is necessarily inactive (i.e., not in an "active mode") in a second piconet in which it is participating.

The piconet 1 (315) of FIG. 3 includes a master node 330, and the slave nodes 310, 320 and 340. The piconet 2 includes the master node 350, and the slave nodes 340, 360, 370 and 380. The piconet 3 includes the master node 390, and the slave nodes 380, 385 and 395. PMP nodes 340 and 380 are used to implement the scatternet shown in the figure. If, for example, node 310 wishes to communicate with node 385, then nodes 340 and 380 might act as bridging nodes by forwarding packets between the two piconets and in particular between nodes 310 and 385. Node 310 transfers the information to node 330, the master node of piconet 1. Master node 330 transmits the information to a PMP forwarding node 340. PMP forwarding node 340 then forwards the information to master node 350, which in turn, transmits the information to PMP forwarding node 380. PMP forwarding node 380 forwards the information to master node 390 which transmits the information to the destination node 385.

As given above, a "scatternet" network includes a set of independent, non-synchronized piconets that are interconnected. Since these different piconets (e.g., 1, 2, and 3) are not typically synchronized in time, a PMP may tend to lose some time when switching from one piconet to another. Furthermore, the temporal unavailability of PMP nodes must be taken into account when coordinating the communication with them. The inefficiencies of switching between piconets to communicate with a PMP present a significant constraint in building scatternets.

A Bluetooth unit participating in multiple piconets (a PMP node) does so on a time division basis. Hence, its presence in the different piconets must be controlled by some scheduling mechanism. Such scheduling is denoted inter-piconet scheduling as opposed to intra-piconet scheduling which is a mechanism controlling the master's polling of its slaves.

Inter-piconet scheduling is one area of difficulty for Bluetooth. Due to the need to synchronize its radio from one piconet to another, a Bluetooth unit necessarily loses some time while switching, which represents an important performance constraint in scheduling the scatternet. Furthermore, the temporal unavailability of PMP nodes must be taken into account when coordinating the communication with them. The inefficiencies of inter-piconet communication present a significant constraint in building scatternets.

There are two effects that can significantly reduce the efficiency of the polling based communication in Bluetooth scatternets. First, nodes that have no data to transmit may be unnecessarily polled, while other nodes with data to transmit may have to wait to be polled. Second, at the time of an expected poll one of the nodes of a communicating node pair may not be present in the piconet. For example, the slave that is being polled may not be listening, or the slave expecting to be polled is not polled by its master. Both situations give rise to inefficiencies in carrying out communications.

One primary problem in inter-piconet communication arises in trying to effectively coordinate the presence of PMP nodes in different piconets such that the occurrence of timing conflicts is minimized. A conflict occurs if a PMP node is assumed to be active by one or more of those piconets it participates in, but the PMP node is not active in the piconets or otherwise unavailable. It can be equivalently disadvantageous if the PMP node is active in one of the piconets that assumes the PMP node to be inactive at that time. Further, the pre-scheduling and the intra-piconet communication may cause inefficiencies and should also be considered.

The timing of reaction time is a common idealization which does not always reflect real-world conditions. For instance, designs of Bluetooth scheduling algorithms often assume that the scheduler reacts in frame f(n+1) to occurrences in frame f(n). However, due to the non-ideal nature of electronic hardware, it is often not possible to react that fast. In effect, what happens in frame f(n) will generally not affect the schedule until k frames later, i.e., frame f(n+k), where k>>1. Such delay can, for example, be introduced by batched scheduling. Batched scheduling means that instead of scheduling frames one by one in a continuous flow, a schedule is computed for a number of frames; e.g., a batch of frames is scheduled all at once. While one batch is being executed the next batch is computed. Since the frames are batched for execution rather than continuously scheduling them, a delay is introduced which leads to inefficiencies in the system.

The fundamental building block in Bluetooth is the piconet which requires intra-piconet scheduling. One system for intra-piconet scheduling is the Fair Exhaustive Polling system (FEP). Such schedulers divide the capacity within the piconet according to the dynamic bandwidth demands of the traffic. For example, the master of the piconet may poll only slaves it considers to be in the "active" mode. These slaves are put into an "active group". Note that inactive nodes may be nodes that are PMPs in other networks or simply nodes that do not have data to send or receive. The nodes in the active group may be scheduled to, for example, a round robin scheduling scheme or a weighted priority scheduling scheme to establish the particular times when data may be shared between the various slaves and master. Transition between the active and inactive groups may be made, for example, in the following manner: inactive nodes are polled periodically to see if they now have data to send. Active nodes may become in-active if they have no data to receive or send for a number of polls.

Regardless of the workings of intra-piconet scheduling, inter-piconet scheduling is still needed to enable devices to simultaneously participate in multiple piconets. In fact, even PMP devices with inter-piconet scheduling capabilities have most of their communication traffic occurring within one piconet such that large portions of the PMP Bluetooth device's time will be as member of one piconet. Thus, the importance of efficient intra-piconet scheduling will not decrease when inter-piconet scheduling is introduced and the inter-piconet scheduler must not deteriorate the efficiency of the intra-piconet scheduler. Ideally, the inter-piconet scheduler should work integrally with the intra-piconet scheduler to provide the overall scatternet communication efficiency. One attempt at providing an efficient inter-piconet scheduler was proposed in previous U.S. patent application Ser. No. 09/454,758, filed Dec. 6, 1999, hereby incorporated by reference for all purposes. However, a more flexible approach as proposed by the present invention provides even better overall scatternet scheduling efficiency.

SUMMARY

Generally, the present invention includes systems and methods for managing communications between two or more ad-hoc networks in an ad-hoc communication network system. The systems and methods of the present invention provide for flexible communication time sharing of one or more nodes (e.g., electronic devices with inter-communication capability) taking part in two or more ad-hoc networks in, for example, a radio communication system (i.e., inter-network communications). For example, the scheduling function for a node shared by two or more ad-hoc networks is provided with a generic functional architecture such that it may be located in any of a number of different locations in the node's functional architecture. Further, a unique mode (e.g., the JUMP mode) may be introduced so as to distinctly identify a node to its neighbors as being a shared node (i.e., a PMP node) involved with multiple ad-hoc networks, e.g., a JUMP node. This unique mode may manage inter-network communications between a PMP node or device and its neighbors located in different networks using, for example, (1) predetermined fixed starting point and length communication windows, (2) time points with flexible starting point and length communication windows, and/or (3) random starting time and length communication windows. The time point based inter-network scheduling approach may also have multiple methods available for managing the inter-network communications.

The time point(s) of the time point methods may be a single point in time, a single time slot, and/or a time interval and an associated meeting window (e.g., multiple time slots) around which communication may, or may not, occur.

In one exemplary embodiment, the communication system may be a Bluetooth communication system having two or more piconets coupled together to form a scatternet enabled so as to have inter-piconet communications. Each piconet may have two or more nodes (e.g., electronic devices with radio communication capability) and at least one of the nodes of each piconet is shared with another piconet (shared node or PMP node). Each node, and particularly shared nodes or PMP nodes, may include and operate an inter-piconet scheduling function (IPSF). The IPSF is preferably optionally located in one of a number of locations in the protocol stack in the node in which it may interact with a link manager (LM), intra-piconet scheduler and/or a baseband buffering and packet processing function. The IPSF may handle information exchanges with various parts of a node and the ad-hoc networks. For example, the IPSF may handle (1) IPSF capacity allocation information between nodes, (2) capacity allocation requests from applications or forwarding functions, (3) link mode set-up, timing parameters, and correlation window control with the link manager, and (4) active piconet and active slave information with the intra-piconet scheduler. Preferably the IPSF is located outside the LM and may use host control interface (HCI) commands.

To provide system scheduling efficiency and flexibility, in one embodiment of the present invention the IPSF of a shared node or PMP node includes a unique mode referred to as the JUMP mode. As such, a node operating in more than one piconet is given the distinct identifier, a "jump node," which is used to identify it to its directly connected neighbors, so as to indicate that the node is a PMP that may "jump" from one piconet to another, or as experienced by its directly connected neighbor nodes, the jump node moves in and out of a piconet at various times (i.e., the jump node may transition from an in-active mode to an active mode, and back to an in-active mode in a piconet at various times). In one variation of the present invention, the unique jump node identifier indicates to a node's neighbors that the PMP node is a shared node involved with multiple ad-hoc networks and may not necessarily be available for every scheduled communication meeting with the other interconnected nodes. Presently known IPSFs do not provide such a unique identifier for PMP nodes and fail to indicate to the piconets that the PMP might not always be available for a scheduled communication session. In this sense there is no distinction between a PMP node and any other node in the system for expected presence at a scheduled communication session.

Further, the IPSF and JUMP mode may have one or more methods available to manage inter-network communication that may include, for example, (1) predetermined fixed starting point and length communication windows, (2) time points with flexible starting point and length communication windows, and/or (3) random starting time and length communication windows. Stated differently, the mode during which a JUMP node may move from one piconet to another piconet is referred to as the "JUMP mode" and it is structured to allow a node (identified as a "JUMP node") to change from participation in one piconet (e.g., in digital communication or available for digital communication) to participation in another piconet (multiplex between piconets) using scheduling methods such as changing piconets during pre-defined window time frame (referred to herein as the "window" method), approximate time points (herein referred to as the "time point" method), and/or at random times (referred to herein as the "random" method). As explained in more detail below, the time point method may have more than one approach available for inter-piconet scheduling to provide maximum flexibility to time multiplexing of inter-piconet communications. In any case, regardless of the scheduling method used for the JUMP mode inter-piconet multiplexing, a JUMP node is able to switch from one piconet to another piconet at any time without becoming disconnected from either piconet as a result of the JUMP node not being available for a particular communication session with any given piconet.

The window method for inter-piconet communication scheduling provides for a reasonably rigid time frame for planned communications between JUMP nodes and their respective neighbors. In this method, the JUMP node and its neighboring node(s) may agree on a fairly strict schedule including a start time, a communication window, and period for recurring communication windows to coordinate timing of communications between one another. Although this method provides a relatively strict method for coordinating communication timing, because the JUMP mode identifier is used it is not necessary that a JUMP node be present exactly at the beginning of each scheduled communication session or even participate in each of the scheduled communication sessions, the respective nodes will remain connected in the scatternet.

As indicated above, another possible method of inter-piconet communication scheduling is the time point method. In one embodiment, the IPSF and JUMP mode may use a loose coordination between the JUMP nodes of respective piconets by defining a single time point, slot, or time interval (referred to herein as a "time point"), around which a communication session may start, without defining the exact length of the actual communication window that will accommodate a particular group of digital data communication between a JUMP node and one of its neighbor nodes. The time point may have a meeting window defined in relation to it. In variations of this embodiment, the time point, slot, or time interval may be periodically repeated in time or the timing of the next occurrence may be updated each exchange interval. As a result, the IPSF is more flexible because there are no strict communication windows to negotiate. Rather, there may be smaller time points to negotiate around which a communication session may begin and the actual communication session may be shorter or longer as needed. Thus, it is easier to agree on a time point to initiate communication rather then allocating a complete communication window. The resulting communication window may be any reasonable length of time starting at a time somewhere around the time point The "time point" method provides a more loose or flexible timing schedule for coordinating communication of JUMP nodes (IPSF). As such, JUMP nodes using the time point method to transition communication from one piconet to another piconet provide expected start times when a JUMP node may become active in a particular piconet or switch from one piconet to another piconet. The time point may provide only an approximate time in which the jump may occur. For example, in one variation, a time point T is provided which indicates where (e.g., a point in time, a single time slot, a time interval or group of slots, etc) a communication between a JUMP node and one of its neighboring nodes may start, without strictly defining the actual length of the communication window (e.g., start and stop time or number of time slots for a communication session). The system may further allow a flexible time frame meeting window around the time point T in which the communication might begin. The start of communication and the length of a communication window can then vary over time according to variables such as traffic and message length. In one variation, one or more time slots on either side of time point T may be included in an expected meeting window. The amount of time or number of time slots on either side of the time point T may be agreed on by the JUMP node and its neighboring node involved in the communication.

In a further variation, the time point method may allow a communication session of a JUMP node with a first piconet (P1) to extend beyond the scheduled start of a scheduled communication session with a second piconet (P2). In the event the communication with the first piconet P1 ends within the scheduled communication session time frame for communicating with the second piconet P2, the scheduled communication session with the second piconet P2 will occur. However, if the communication with the first piconet P1 ends after the end of the scheduled communication session time frame for the second piconet P2, that communication session with the piconet P2 is skipped. This method may be used to accommodate a burst of information that needs to be communicated between P1 and P2, without the need to renegotiate windows due to the amount of information being larger than a predetermined window size. Likewise, a JUMP node scheduled to be active in a first piconet P1 with low utilization may enter a second piconet P2 before its designated time point so as to possibly get more data through or give less delay for the second piconet P2.

In any case, the master node in the second piconet will not terminate the link with the JUMP node since it understands that the JUMP node is operating in the JUMP mode time point method. Rather, the master node in the second piconet may attempt to poll the JUMP node again immediately or at the next scheduled communication time frame. Stated differently, if the jump node is not finished exchanging data with an active node in a first piconet, it may suspend a scheduled jump to the second piconet until the data exchange with the first piconet is completed. However, since the node is identified as a "jump node" the master node of the second piconet will not disconnect from the jump node because it recognizes that the jump node might be busy communicating with another piconet. Further, a JUMP node using the time point method may enter a communication session with the second piconet before time point T if it is not active communicating with the first piconet (or other piconets) to possibly get more data through while time allows. As such, the time frame during which a JUMP node communicates with various piconets may change dynamically according to needs.

The IPSF and JUMP mode may include one or more of multiple methods for managing scheduling or distribution of the time points for inter-network communications that provides even more flexibility. For example, the IPSF and JUMP mode may have one or more of the following five exemplary methods available to manage inter-network communication scheduling: (1) predetermined fixed length time interval within which a set of communications with all interconnected piconets may occur, (2) fixed time interval between communications of the respective piconets, (3) different predetermined time intervals for communication with different piconets, (4) random communication cycles that may vary for communications with respective piconets, and/or (5) arbitrary with no pre-determined periods and the time points are updated for each communication with each piconet. Stated differently, the mode during which a JUMP node using the time point method may move from one piconet to another piconet is referred to as the "JUMP mode" and is structured to allow a node (identified as a "JUMP node") to change active participation (i.e., digital communications) from one piconet to another piconet during flexible time points without the need for strict adherence to a specifically scheduled time, and time point distribution over time may be determined by one or more approaches.

The five exemplary different approaches may be used for custom time point distribution. First, the predetermined fixed length time interval method for inter-piconet communication scheduling provides for a reasonably rigid time frame for planned communication between JUMP nodes and their connected nodes. In this case, the JUMP nodes may agree on a strict time interval having a defined length for accommodating at least one time point for each inter-piconet session. This approach provides relatively strict coordinated communication timing. When an existing node starts participating in a new piconet, the predetermined fixed length time interval remains the same and a new time point would be inserted into the fixed length interval. Second, the fixed time interval between piconets method for time point based inter-piconet scheduling may distribute time points for various interrelated piconets by keeping constant the time interval between respective piconets. Third, the different predetermined time interval for different piconets method for time point based inter-piconet scheduling may intersperse time points for different piconets by using a different time interval (between consecutive communications) for each of the different links between respective JUMP nodes. Fourth, the random time interval approach for time point based inter-piconet scheduling may distribute the time points by letting the time between time points of respective interconnected nodes be a random time period as determined by a predefined algorithm. Fifth, arbitrary with no predetermined periods approach for time point based inter-piconet scheduling may distribute the time point occurrence arbitrarily and without any predetermined period agreed upon between the respective nodes of the scatternet except for the two nodes involved in the communication session data exchange.

Finally, using the random method for IPSF and the JUMP mode, the JUMP nodes do not coordinate their inter-piconet communications at all. Rather, the JUMP nodes communicate completely randomly and stay in a piconet until communication packets have been sent or a time out occurs. Then the JUMP node may cycle through a list of other piconets to search for a master node to poll it.

Thus, as illustrated above, use of the JUMP mode and jump node identifier for the IPSF time multiplexing of data exchange as proposed in the present invention provides a great deal of flexibility for communication scheduling between ad-hoc networks.

BRIEF DESCRIPTION OF THE DRAWINGS

The objects, features and advantages of the present invention will become more readily apparent to those skilled in the art upon reading the following detailed description, in conjunction with the appended drawings, in which.

DETAILED DESCRIPTION

In general, the present invention is applicable to any communication system and particularly to inter-network communications. In many of the following specific embodiments, the present invention will be described in the context of Bluetooth networks and using terminology applicable to Bluetooth networks. However, it will be appreciated that the invention is equally applicable to other network technologies and particularly to ad-hoc network technologies. As such, the Bluetooth specific exemplary embodiments described herein may be generalized to other communication network technologies.

The present invention includes systems and methods for flexible communication time sharing of one or more electronic devices with inter-network/piconet communication capability (herein referred to as network "nodes") taking part in two or more distinct networks in, for example, a radio communication system. In preferred embodiments the radio communication includes ad-hoc networks which are created dynamically by two or more nodes requesting to communicate with one another using radio communications. Often time one network may wish to communication with one or more nodes in another network, this requiring inter-network communication scheduling. The systems and methods of the present invention preferably provide flexibility for providing such inter-network communications.

Figure 1:
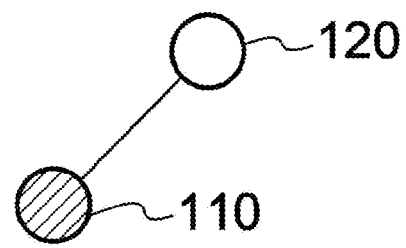
FIG. 1 depicts an exemplary ad-hoc network, for example, a Bluetooth piconet.
Figure 2:
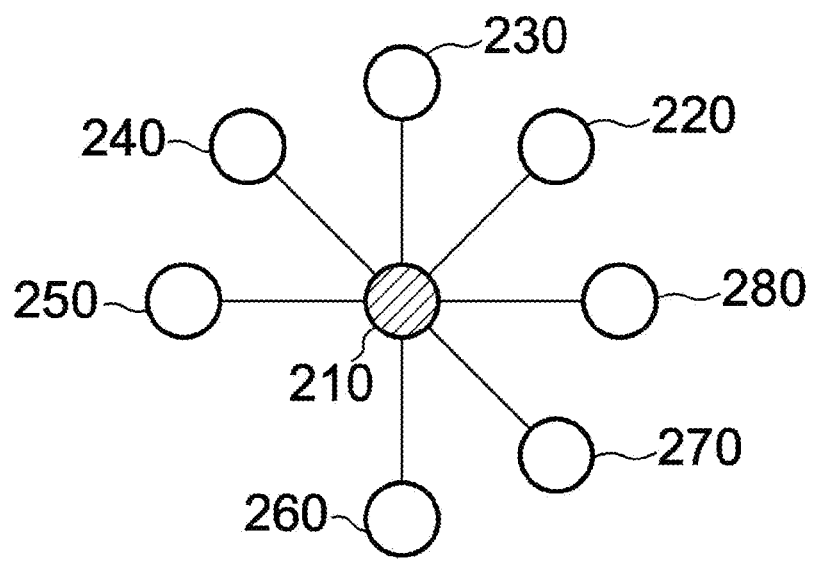
FIG. 2 illustrates an exemplary piconet with a master node coupled to a plurality of slave nodes.
Figure 3:
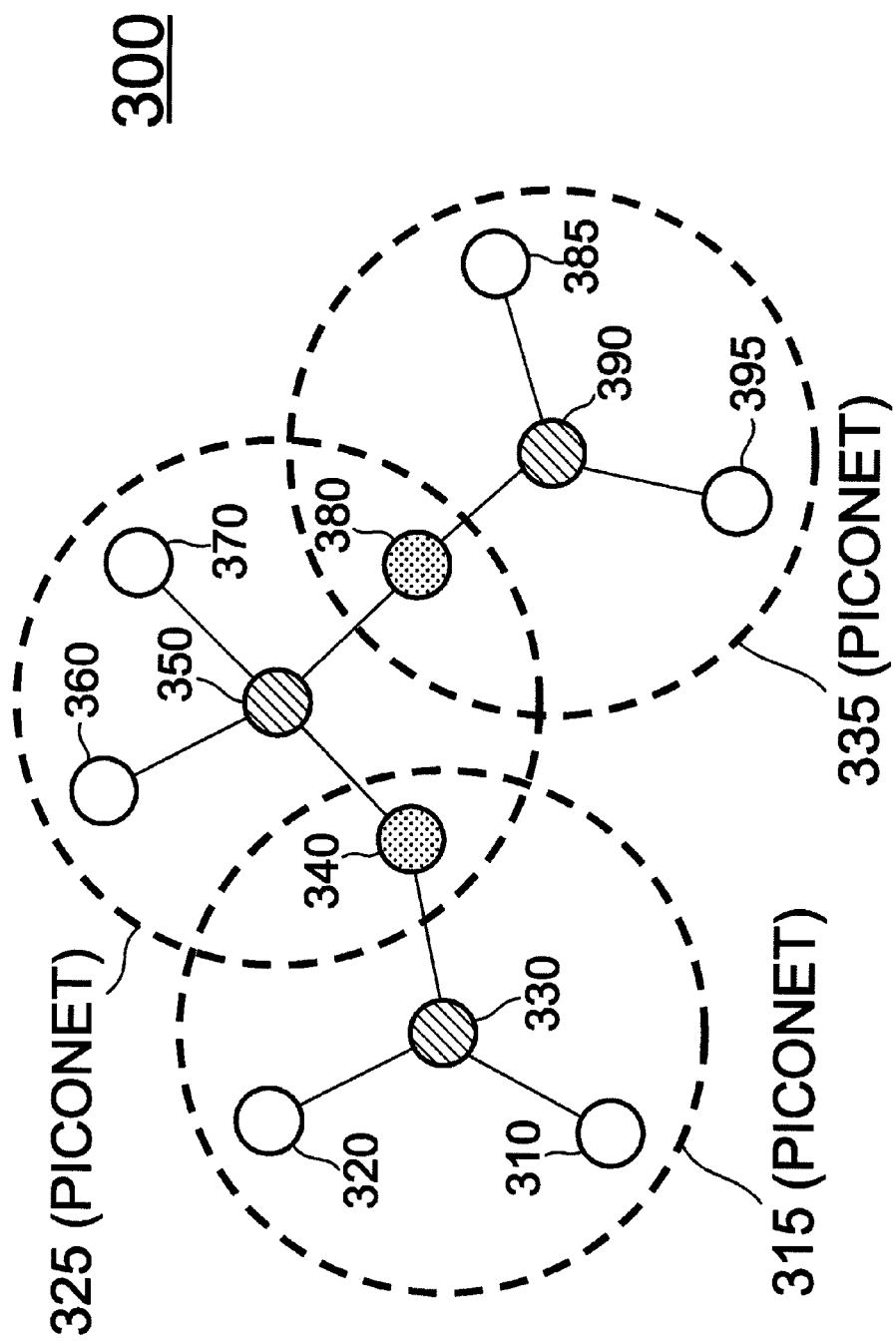
FIG. 3 depicts an exemplary scatternet comprising piconet 1, piconet 2 and piconet 3.
Figure 4:
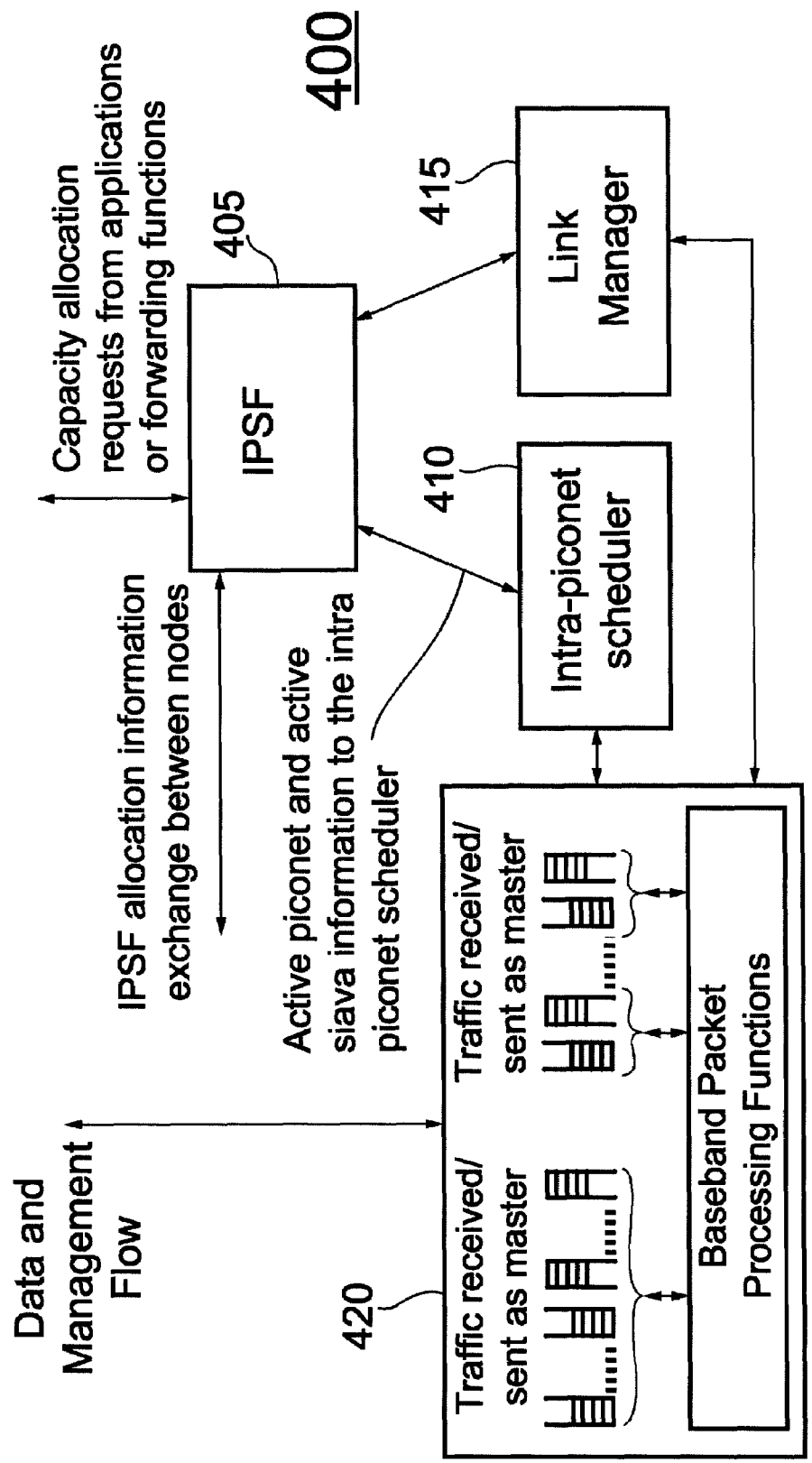
FIG. 4 depicts an exemplary generalized functional architecture of an inter-piconet scheduling function (IPSF) and some of its relationships to various other parts of an ad-hoc network node.

Referring to FIG. 4, one possible functional diagram for the scheduling function for a node shared by two or more ad-hoc networks is provided. The system 400 includes an inter-piconet scheduling function (IPSF) 405 that has been provided a generic functional architecture such that it may be located in any of a number of different locations in the node's functional architecture. The system may be, for example, an electronic device with Bluetooth communication capability. As illustrated in this example, the IPSF 405 is put into context with the intra-piconet scheduler 410, the link manager 415, and the actual baseband buffering and packet processing functions 420. Noteworthy is that the IPSF is not necessarily located in the link manager, but may be located in any location of the device which provides flexibility to achieve the best execution possible dependent on the device type and system architecture. It is more important that the various information exchanges occur between the IPSF 405 and the various other function aspects of the system 400. As illustrated, the IPSF may be communicatively coupled to the intra-piconet scheduler 410 with which it exchanges active piconet and active slave information; Further, the IPSF 405 may be communicatively coupled to the link manager 415 with which link mode set-up, timing parameters, and correlation window control may be shared. Similarly, the IPSF 405 may share capacity allocation requests from applications forwarding functions IPSF allocation information between nodes via various other parts of the system 400. The intra-piconet scheduler and link manager may also be coupled to the various baseband packet processing functions 420. This flexible functional architecture may be supported by various hardware of an electronic device having communication capabilities necessary to execute coordinated communications between various networked devices.

As indicated in FIG. 4, the IPSF 405 is not necessarily located in the link manager 415. As such, if the IPSF 400 is located outside the link manager 415, the IPSF 405 will not require inter-piconet specific link manager protocol messages. This provides system flexibility so that new link manager protocol messages do not need to be created for operations of the IPSF 405 operations. Further, the IPSF may be executed on a separate processor and not directly on the one running the rest of the Bluetooth baseband functions. However, the particular location of the IPSF 405 in the system 400 may raise other issues. Each networked device will likely have a host controller interface (HCI) which is an interface between the software and hardware. The software can control the hardware via the HCI. If the IPSF 405 is located above the host control interface (HCI) of the device, all the exchanges need to pass via the HCI and be based on currently support of HCI commands, such as the power save modes. Locating the IPSF 405 above HCI is particularly likely for a Bluetooth architecture. However, the IPSF 405 also needs to be able to communicate with the intra-piconet scheduler 410, which would likely be located below the HCI. In this case, the IPSF will need to use HCI message protocol or modify the HCI protocol, but this may be a vendor specific message. As an alternative, the IPSF 405 may also be divided into one information exchange part above the HCI and one actual scheduling part below the HCI. In any case, the present invention provides functional flexibility to the location of the IPSF 405 so that existing link manager 415 and other system messaging protocols require less modification to accommodate inter-piconet communication scheduling systems.

For further IPSF flexibility, a unique mode (e.g., the JUMP mode) may be introduced so as to distinctly identify a node to its neighbors as being a shared node involved with multiple ad-hoc networks, e.g., a JUMP node. The new mode, e.g., the JUMP mode, may distinguish a node active in several piconets from an active node with a single piconet presence. This unique mode may manage inter-network communications between a shared node or device and its neighbors located in different networks using, for example, (1) predetermined fixed starting point and length communication windows, (2) time points with flexible starting point and length communication windows, and/or (3) random starting time and length communication windows. The time point based inter-network scheduling approach may also have multiple methods available for managing the inter-network communications and the time point(s) may be a single point in time, a single time slot, a time interval or multiple time slots and in one variation include a meeting window (e.g., a group of time slots around the time point) around which communication may, or may not, occur.

As previously explained, the Bluetooth communication system is based on a master-slave architecture in which intra-piconet communication traffic flows between a master and a slave using Time Division Duplex (TDD) frames. The slaves in a piconet are synchronized with the frame and frequency hoping sequence of the master. For a single piconet the task of providing a controlled bit rate and delay of the traffic to the slaves is managed by the master alone and should be handled with a scheduler located in the master unit (e.g., intra-piconet scheduler 410). One method for intra-piconet scheduling may be a modified exhaustive polling algorithm, denoted Batched Fair Exhaustive Polling (B-FEP), is presented in commonly assigned U.S. patent application Ser. No. 09/455,172 filed Dec. 6, 1999, hereby incorporate by reference. B-FEP is believed to give high BW efficiency with a fair allocation, while still being simplistic. However, this method does not address inter-piconet scheduling.

Further, Bluetooth devices may have a number of modes to establish intra-piconet communications including a "standby" mode, a "connection" mode, an "active" mode, and a "power save" mode. A standby mode is entered when a Bluetooth device is not logically connected (via Bluetooth technology) to any other Bluetooth device, i.e., is not part of any piconet. This node is then considered an idle node. A connection mode is entered when a Bluetooth device establishes a logical existence in a piconet (as either a master or a slave). Once the logical connection is established, the node may enter one of the active or power save modes. An active mode is entered when a Bluetooth device is made available for a communication session with another Bluetooth device. A power save mode is entered when a Bluetooth device is operating in a connection mode but is not in an active mode for a given piconet, i.e., the node is not available for a communication session with a given piconet (although if the node is a PMP node it might be in a power save mode with respect to one piconet while communicating with another piconet). As an example, a slave in a piconet can be addressed (e.g., polled) at any start of a frame unless a power saving mode (e.g., any of the park, sniff, or hold modes) is invoked in the slave. Once addressed, the slave enters a communication session with its master in the active mode. The power save modes are typically used to reduce the use of energy by the Bluetooth transceiver for power conservation since many Bluetooth enabled devices are battery operated. Although some previous proposals have been made for using one or more of the power save modes as a means for scheduling inter-piconet communication session coordination, the power save modes intended purpose is for establishing and operating a Bluetooth device more efficiently during intra-piconet communications. As such, there are various inefficiencies that may occur as the result of using a power save mode for inter-piconet communication coordination. For instance, the sniff mode automatically invokes an increased correlation window for the radio since it is expected to "wake up" from a low power state where the clock run more inaccurately. This is in most cases not necessary if it is used in an PMP node since the unit has been running the clock at normal power at the duration of sniff period, but in another piconet. Moreover, the sniff and hold modes requires a control signaling that is unnecessarily heavy for the purpose of inter-piconet scheduling.

With the current Bluetooth modes and specification, a master always knows when it can poll a slave, regardless of which mode the link to the slave is in when only intra-piconet communications are considered or a rigid inter-piconet scheduling method is used. If the slave does not respond, after a definite number of attempts, the master can safely assume that the link is erroneous and may take appropriate actions, such as disregarding or disconnecting the link. This is a key property of Bluetooth, as it simplifies the operation of a master. The default assumption for a link in ACTIVE mode is that the slave is always present on the link, i.e., a slave must always answer a poll from the master. This means that under this system construction a slave cannot participate in several piconets if having an active link in one piconet On the other hand, the present invention is particularly concerned with providing flexible inter-piconet communication, i.e., communication between nodes belonging to different piconets. Scheduling the presence of a Bluetooth unit in different piconets in order to enable a controlled inter-piconet traffic flow adds various aspects not comprehended or easily accommodated by the presently defined Bluetooth modes. Since a single transceiver unit is assumed, a Bluetooth unit shared with two or more piconets can only be active with one piconet at a time. If the shared Bluetooth unit is a master in one piconet, then the other Bluetooth units in that piconet cannot send or receive any information to the shared node during the time it is communicating with the other piconet. In short, in one aspect, the present invention addresses the problem of scheduling time periods where both nodes of a link have their transceiver tuned in to the same piconet, while minimizing losses due to timing mismatch. A timing mismatch occurs when two units in separate piconets each have idle capacity available, but are unable to use the idle capacity because there is no simultaneously available time window for mutual inter-piconet communication. While two units are scheduled for inter-piconet traffic (one master and one slave) the slave unit becomes part of the master's piconet and should also be scheduled by the intra-piconet scheduler. Thus, inter-piconet traffic scheduling also raises issues of intra-piconet traffic scheduling. Further, since data traffic typically experiences a certain level of burstiness in its traffic patterns, the inter-piconet scheduling function 405 should allow for a dynamic allocation of time among the various nodes connected to a node shared by two or more piconets. At the same time, the use of a single transceiver unit forces a rather strict timing of the master and slave entities in nodes belonging to different piconets. The respective nodes need to become active at the same time to utilize an available time window in their common piconet efficiently.

Given these complexities and other related to communication scheduling in a scatternet, the present invention introduces a new mode, the "JUMP" mode, particularly directed to the requirements of inter-piconet communication scheduling and nodes shared by two or more piconets in a scatternet. Further, the JUMP mode introduced by the present invention for implementing the IPSF helps overcome any shortcomings, inefficiencies or concerns that might result from using the current Bluetooth modes. A particularly good reason to introduce the JUMP mode is to allow a more lose definition of the inter-piconet time multiplexing than allowed with other Bluetooth modes such as the power save modes. Thus, a specific mode such as the JUMP mode that defines the behavior of a shared inter-piconet node would give a cleaner and more consistent specification and also give more freedom to define several additional operations for efficient scatternet operation.

Figure 5:
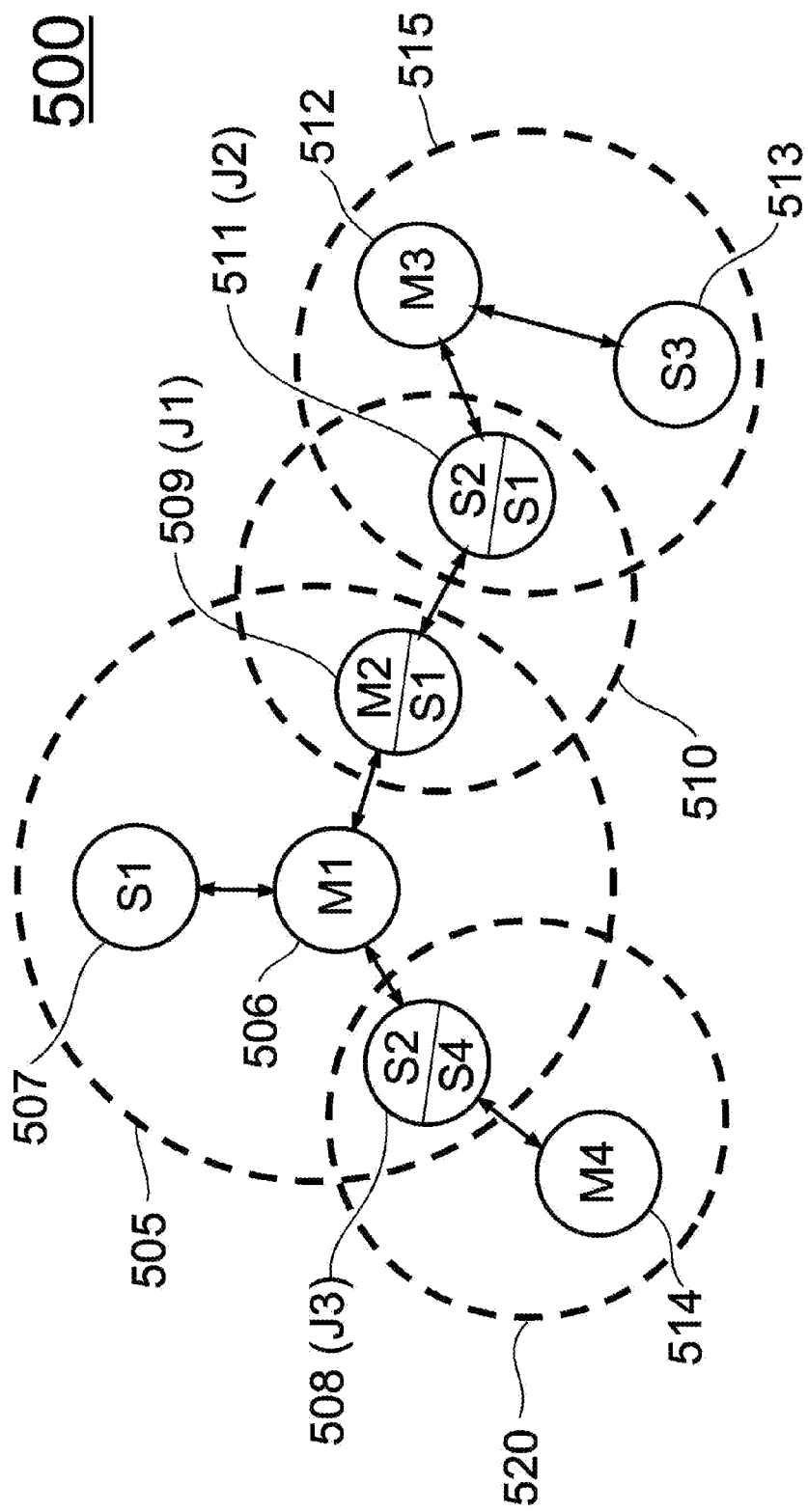
FIG. 5 illustrates an exemplary ad-hoc network scatternet with a number of inter-piconet nodes identified as JUMP nodes operative in JUMP mode.

Referring now to FIG. 5, an exemplary scatternet illustrating various nodes shared by two or more piconets is provided. The scatternet 500 has four piconets, P1 (505), P2 (510), P3 (515), and P4 (520). Piconet P1 (505) has four participants, master M1 (506) and three slaves S1 (507, 508, and 509). Piconet P2 (510) has a master M2 (509) and slave S2 (511). As indicated, node 509 is a PMP shared between piconets P1 (505) and P2 (510) and thus is designated a JUMP node J1 including both M2 and an S1. JUMP node J1 may thus operate in the JUMP mode and move in and out of P1 and P2 as needed. Piconet P3 (515) has a master M3 (512) and slaves S3 (511 and 513). As indicate, node 511 is a PMP shared between piconets P2 (510) and P3 (515) and thus is designated a JUMP node J2 including both an S2 and an S3. JUMP node J2 (511) may thus operate in the JUMP mode and move in and out of P2 and P3 as needed. Piconet P4 (520) has a master M4 (514) and slave S4 (508). As indicated, node 508 is shared between piconets P1 (505) and P4 (520) and thus is designated a JUMP node J3 (508) including both an S1 and an S4. JUMP node J3 (508) may thus operate in the JUMP mode and move in and out of P1 (505) and P4 (520) as needed. Note that although the JUMP nodes J1-J3 of FIG. 5 each are shared by only two piconets, a scatternet may include JUMP nodes shared by two or more piconets.

As previously indicated, the JUMP mode and JUMP node designation for nodes J1 (509), J2 (511), and J3 (508) distinguishes a participant in multiple piconet node, active in several piconets, from a node only participating in a single piconet (e.g., S1 507 or M3 512). By letting PMP nodes such as J1 (509), J2 (511), and J3 (508) establish a JUMP mode, all neighboring nodes (e.g., M1 (506), M3 (512) and M4 (514)) should be aware that the PMP node might move in and out of the piconet. By introducing a specific mode for identifying a node shared with multiple piconets, e.g., the JUMP mode, more freedom is provided when designing an inter-piconet scheduling scheme than if one or more of the power save modes are used. Further, in addition to the JUMP mode, these PMP nodes may contain the full complement of typical Bluetooth modes unencumbered by the additional IPSF aspects. A specific mode, like JUMP mode, that defines the behavior of a PMP node as a JUMP node may give a cleaner and more efficient scatternet operation.

Further, in one variation of the invention, the JUMP mode may be configured to have similar features to the power save mode for avoiding void polls and extending correlation windows. Using the typical Bluetooth modes and specification, if a slave does not respond within a certain number of polls a link a failure may be assumed and the link torn down. However, the JUMP mode may include a feature that helps the master maintain the link in spite of missed polls. For example, if the JUMP node is a slave and its neighboring node is a master (e.g., J3 (508) and M1 (506)), then the master node (M1) will know that the slave (J3) may miss a poll and will not necessarily disconnect its link. In one variation, the master may have a counter which will only disconnect a link with a JUMP node when a certain number of missed polls have been reached. The threshold for the JUMP node would typically be higher then that of a typical slave. Moreover, if a slave node does not resynchronize with its master frequently enough the clock drifts between the two devices may cause the slave's correlation window to miss the transmission (TX) slot from the master. A correlation window is included in the radio layer to find the frame limits of the packets that belongs to a particular piconet. A correlator is invoked in the receiver that searches for the access code bit pattern "in the air" for that piconet. Normally the clock is relatively accurate so the guess where the frame limits are (where the packet is sent) is good, thus only a short window of, for example, 10 microseconds are necessary. However, if the node has been sleeping for a while the clock may have drifted off so that the guess ends up outside the 10 us window. In this case, the JUMP node may miss the TX slot due to error in synchronization of the correlation window which may also cause the master to disconnect the slave. To address this issue, a JUMP node that is operating as a slave may open up its correlation window large enough to counter for any clock drift of a master that might have occurred since the last communication with the master, so as to find its master's slot boundaries and re-synchronize by, for example, finding a packet with the access code somewhere. Note that it may listen to any packets sent from any master or slave in the piconet to synchronize its clock offset to the piconet again (actually to the master's clock).

Managing inter-piconet communication is the main focus of the JUMP mode. And since the JUMP mode is a new mode there is more freedom to define how it may work. Therefore, as explained herein, the JUMP mode may include a number of general methods or approaches and sub-methods for managing and coordinating inter-piconet communication scheduling. The JUMP mode may have one or more general approaches to managing inter-network communications between a shared node or device and its neighbors located in different networks. For example, the JUMP mode may use: (1) predetermined fixed starting point and length communication windows, (2) time points with flexible starting point and length communication windows, and/or (3) random starting time and length communication windows, for coordinating various communications with different piconets. The time point based inter-network scheduling approach is particularly flexible and may have multiple sub-methods available for managing the inter-network communications. The time point(s) may be a single point in time, a single time slot, and/or a time interval and may have an associated meeting window (e.g., multiple time slots) around which communication may, or may not, occur. First, the three exemplary general approaches for performing IPSF using the JUMP mode will be explained. Next, the time point approach will be explained in more detail with various sub-methods of time point allocation. A simplified scatternet will be used to help explain these different approaches.

Figure 6:
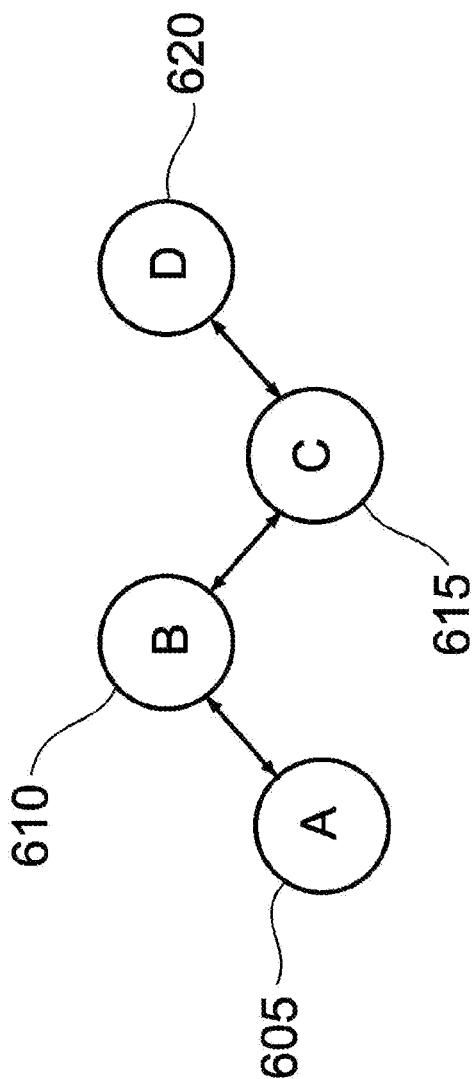
FIG. 6 depicts an exemplary ad-hoc network scatternet with four JUMP nodes in JUMP mode.

Referring now to FIG. 6, another exemplary scatternet 600 is provided. A first node 605, node A, is coupled to a second node 610, node B. The second node 610 is coupled to a third node 615, node C. And the third node 615 is coupled to a fourth node 620, node D. These four nodes may be coupled in one of any number of piconet master-slave configurations sufficient to form an operable scatternet. For example, the scatternet 600 may include two piconets; a first piconet having nodes A and B, and a second piconet having nodes B, C and D. For purposes of explaining various exemplary approaches to the IPSF and JUMP mode of the present invention, we will assume the scatternet 600 is formed by three piconets. In this case, the first piconet includes node A (605) as a master and node B (610) as a slave. The second piconet includes node B (615) as a slave and node C (615) as a master. The third piconet includes node C (615) as a slave and node D (620) as a master. It is to be understood that scatternet 600 is simplified and that the following exemplary approaches to inter-piconet scheduling and JUMP mode configuration and operation is equally applicable to any size scatternet with any number of additional nodes. Although not shown, each of nodes A-D could be coupled to any number of additional nodes in a much larger scatternet.

Figure 7A:
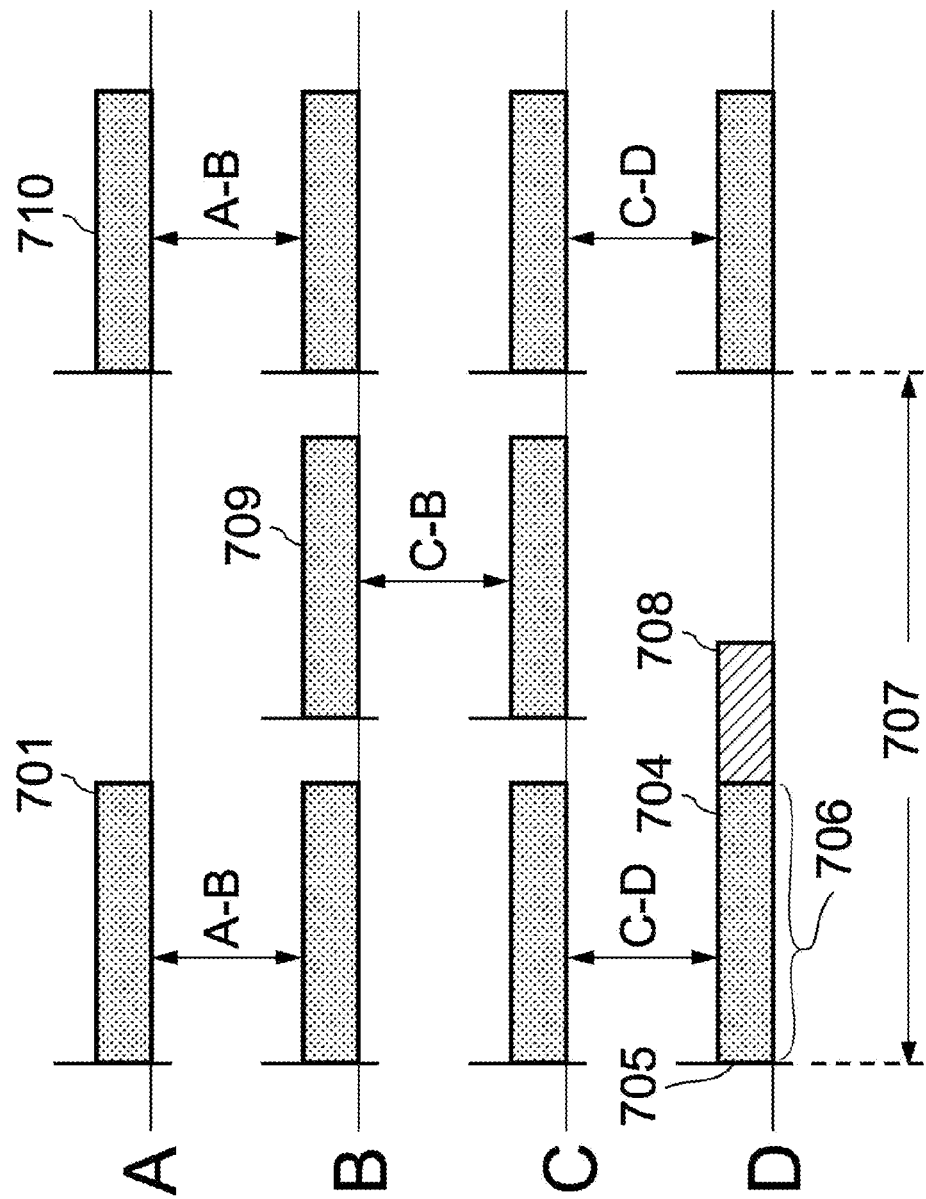
FIGS. 7A-7C each illustrate one of three exemplary methods for operating the ad-hoc network scatternet of FIG. 6 in JUMP mode to coordinate various communication sessions between the respective JUMP nodes.
Figure 7B:
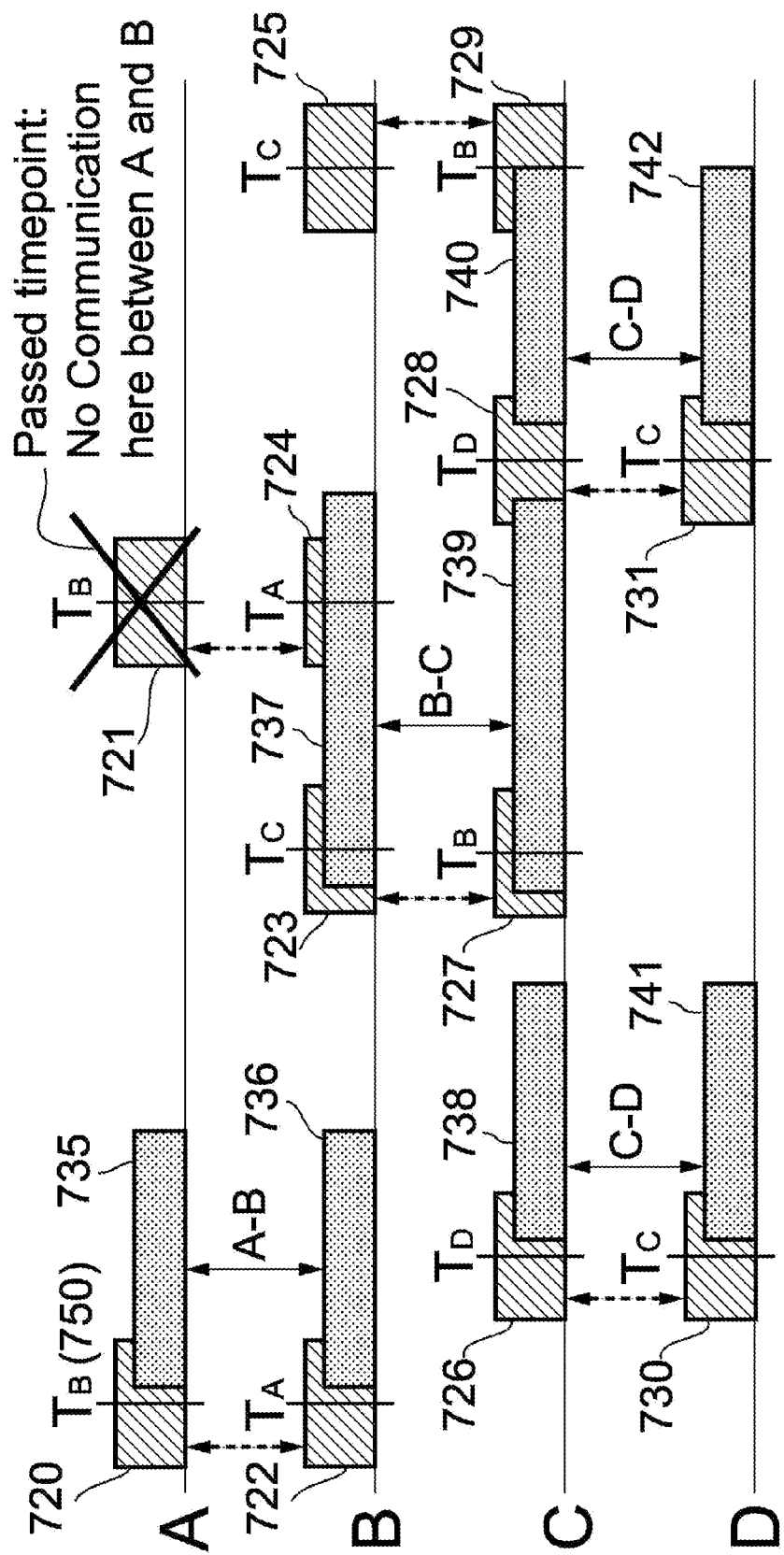
Figure 7C:
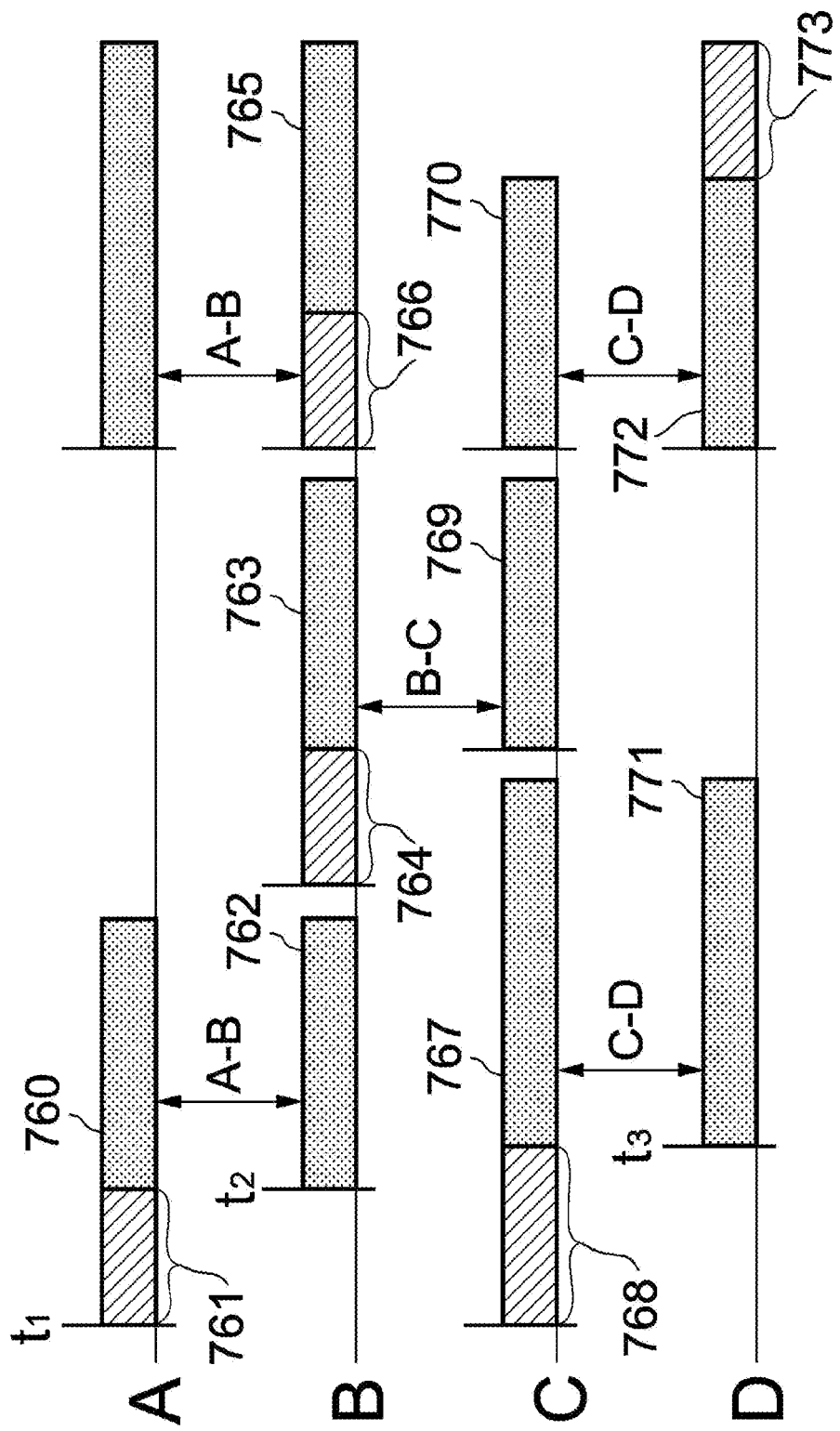

Referring now to FIGS. 7A-7C, three exemplary approaches to coordinating inter-piconet communications will be described. One general approach to inter-piconet communication coordination illustrated in FIG. 7A will be referred to herein as the "windows" approach. With the window approach a JUMP node may agree on a strict timing communication window with a defined start time 705, window size 706, and period 707 (i.e., a period for recurring communication session window, for example, every 50 milliseconds). The values for the start time 705, window size 706, and period 707 may be part of the information exchanged on a per window basis or be periodically updated to adjust for system variations such as changes in the communication traffic between the various piconets sharing a JUMP node. Although the start time, communication session window size, and period for a recurring communication window may be strictly predefined so as to properly schedule time for each of the piconets in a scatternet, the JUMP mode may add flexibility. For example, when the window method is used with the JUMP mode a temporary occurrence of bursty data communication may be accommodated by the JUMP node maintaining a communication session with a first piconet beyond the end of its preplanned communication session window time frame as illustrated by the cross-hatched portion 708 of the communication session window 704 of the C-D nodes communication. As indicated, this extension may even go into or through the scheduled communication time for a second piconet, e.g., the B-C piconet (nodes B and C), without causing a link disconnect with the second piconet. If so, the C node 615 may continue to communicate with the D node 620 and not poll slave node B 610 until a subsequent pre-scheduled poll time. On the other hand, if using the scheduled communication timing provided in FIG. 7A, the communication session window 709 between node B 610 and node C 615 was extended into the scheduled communication session 710 between node A 605 and node B 610, then node B 610 would not respond to node C 615 when polled. Further, node C 615 would not poll node D at the scheduled time. When the window approach is used with the JUMP mode a relatively lightweight protocol may be used to develop an agreed upon communication session window coordination.

Another general approach to inter-piconet communication coordination is referred to herein as the "time point" approach. Referring to FIG. 7B, an exemplary timing diagram for the time point approach is provided. The time point approach provides for a more loose and flexible communication session coordination between the nodes of respective piconets by defining a single point in time, time slot, or time interval (T) where communication may start, without defining the exact length of the communication window. The data exchange of data for the time point approach is coordinated by means of the time points, $T_i$ for piconet I, and meeting windows to reduce the complexity of scheduling.

The time point is a point or interval of time in which a communication session may be initiated between the JUMP node and one of its neighbor nodes. For example, the time point may be a point in time like $T_B$ 750 or a time interval like interval 725 as illustrated in FIG. 7B. Although not clearly illustrated, the time point may also be a predefined system period of time, such as a slot in Bluetooth. The time point may be periodically repeated or timing for the next scheduled time point may be updated during information exchange between the JUMP node and one of its neighbor nodes of one or more communication session (e.g., communication session 735). The major advantage of using the time point approach is that there is no strict communication window to negotiate or schedule. Rather, there is a shorter length of time that needs to be negotiated, e.g., a single point in time (e.g., TB 750), a slot (not shown), or predefined time interval (e.g., time interval 720) typically shorter then an actual communication window. The actual communication session window length, for example communication session window 735, is not negotiated but is flexible and may be based on various factors such the number of piconets connected to a JUMP node, communication traffic through the JUMP node, etc. Without the strict and longer communication session windows to negotiate, it is easier to agree on a time to initiate a communication session. However, without allocation of the strictly defined communication session windows the capacity between nodes will be less controlled and less certain for any particular point in time. This uncertainty is offset by the time point approach's flexibility and ability to accommodate temporary bursty communication requirements by allowing time points for one piconet to be skipped to accommodate bursty traffic for another piconet The slots or time intervals adjacent to T may form a meeting window wherein the two neighboring nodes, at least one being a JUMP node, have an agreed probability of being present. For example, meeting windows 720-731 could have a time point T centrally located and probability distribution on either side as illustrated in FIG. 7B. This could for instance be an increasing double sided probability function with a peak in T. Off course, T need not be centrally located but may be to the left or right side of the meeting window. Moreover, as previously indicated a JUMP node using the JUMP mode may extend its communication session window length or data exchange in one piconet into, or beyond, the meeting window for another piconet to accommodate bursty traffic. For example, the communication session window 737 and 739 that occurs between node B 610 and node C 615 starts in meeting windows 723 and 727 and extends beyond meeting windows 721 and 724 scheduled between node A 605 and node B 610 and into meeting windows 728 and 731. In this case, the communication session between node A 605 and node B 610 scheduled to begin at meeting windows 721 and 724 will be skipped. However, the next scheduled meeting window between node A 605 and node B 610 will likely result in a communication session that starts during the next time point T meeting window. Of course, another lengthy communication session window between node B 610 and node C 615 may occur in the next scheduled meeting window between nodes A and B, and thus the next possible communication session between node A 605 and node B 610 could also be skipped. To prevent one particular piconet from consistently missing consistent successive communication session windows, it is possible that a consistently wider meeting window could be allocated (may be related to some probability as well) each successive time the meeting window is skipped. Similarly, an increased level of priority could be given to a piconet that has been skipped in one or more communication session cycles. For example, after say n missed timepoints, the two nodes may be forced to be available during the next timepoint, e.g., the probability of a meeting is set to one. This approach allows for taking care of temporary bursts of communications between the various piconets sharing a JUMP node, without renegotiate communication windows or meeting windows.

Further, a JUMP node may start earlier in a scheduled meeting window when it needs to accommodate a longer communication with one piconet and there are no active communication sessions with any other piconet to which it belongs. This too may allow a JUMP node to get greater information efficiency without renegotiating meeting windows or communication sessions windows. For example, node C 615 is able to begin communication with node B 610 before $T_B$ early in meeting window 727 for communication session 739 since communication session window 741 with node D 620 is completed. Thus, by using the time point approach with the JUMP mode, there are more easily scheduled meeting times, more flexible communication session window lengths, and the ability to skip scheduled communication sessions completely without necessarily having renegotiating messages between the affected nodes.

The nodes using the time point approach would exchange co-ordination information that may include the periods between successive time points T or time point distribution. As discussed further below, a number of variations in approach to the time point distribution are possible. For example, in one variation it may not be necessary to have the same period length for all the piconets of a JUMP node since Ts may be allowed to be passed over without entering an active communication session. If the periodicity is relaxed even a random pattern may be used for time point distribution. A more detailed discussion of some exemplary time point distribution schemes will be discussed a little later. However, rather than using the time point method, a random approach may be used for IPSF and the JUMP mode.

As illustrated in FIG. 7C, rather then establish a communication window or a time point, the IPSF may use a random approach to establish communication sessions in the JUMP mode. In this case, no coordination needs to be carried out at all. The JUMP nodes may communicate totally random and stay in a piconet until a break in the communication occurs (e.g., number of packets available to send have been sent) or a timeout expires. For example, as for communications between node A 605 and node B 610, node A 605 may start looking for communications with node B 610 (e.g., polling node B) at time $t_1$. However, node B 610 may be looking to establish a communication session with node A at random times and thus might not be looking to communicate with node A 605 until some time later, time $t_2$. If at time $t_2$ node A is still looking to establish a communication session with node B 610, then one will occur. As such, in the example provided in FIG. 7C a communication session occurs during the communication session window 762 and there is a missed data exchange 761 that occurs while node A 605 waits for node B 610 to participate in meeting window 760. When the communication session 762 between node A 605 and node B 610 is completed (e.g., when all the information available at the time has been exchanged) then each node is free to actively seek another communication session with another node or piconet. Operating in this random manner, there will be a number of missed communication data exchange opportunities 761, 764, 766, 768, 773 that may occur and may be a number of times when there is no overlap between the meeting windows for some period of time even though data needs to be communicated. However, the master nodes will not disconnect the JUMP nodes unless the master nodes have an indication that there is a problem, because the master nodes know the identity of the various nodes as JUMP nodes in JUMP mode will likely return to communication in a reasonable amount of time. For example, in one variation master nodes may disconnect the JUMP nodes if they do not respond for a predetermined relatively long period of time. Further, the random approach may include a learning algorithm which adjusts the periodicity of meeting windows and length of meeting windows based on experience with its various piconets. In one variation, if one piconet hasn't been visited for predefined time, say 200 ms, the jump node stays in that piconet there until it finds a node in that piconet to communicate with. Should set an upper limit may be set on the time a jump node revisits (and communicates with) a piconet.

In various embodiments of the invention, the intra-piconet scheduling and the inter-piconet scheduling may be independent of one another or inter-dependent on one another. For example, one way of coordinating inter-piconet scheduling with intra-piconet scheduling is to let the intra-piconet scheduler know if and when a node is present in the piconet. This information can be used by the intra-piconet scheduler to poll, or not poll, a JUMP node depending on its presence. However, the JUMP node may change its behavior based on what the intra-piconet scheduler does. For example, the JUMP node may stay longer in a piconet if another member of that piconet indicates that it has a lot of packets to send to the JUMP node and/or it may skip a scheduled piconet communication with a piconet that had indicated during the last time they communicated that it has less information to send.

Although the window, time point, and random approaches have been discussed separately, it will be understood by those skilled in the art that they may be used individually or in any combination (for a single node or different nodes). For example, the IPSF and JUMP mode may start with the random approach and revert to either the time point or window approach if the efficiency does not meet a desired level. In one variation, the approach could be to switch from one type of approach to another based on the amount of traffic experienced. In another variation, one JUMP node might be using the window approach while another JUMP node is using the random approach and yet another JUMP node in the scatternet is using the time point approach.

The following discussion will focus on various alternatives and details regarding using the time point approach for IPSF and the JUMP mode. Five general areas related to the time point approach which are particularly important and will be described in detail includes: (1) the distribution of time points for a JUMP node; (2) information exchange for JUMP mode set-up and for adding/removing nodes; (3) indication when a data exchange shall exceed pass another time point; (4) resource control for fairness best effort and guaranteed traffic; and (5) traffic adaptivity resulting in moved time points. Further, five exemplary methods or approaches for the distribution of time points will be described.

As described above, the time point approach includes agreement as to the start time, T, of an inter-piconet communication session that may be between, for example, a JUMP node and an active node or between two JUMP nodes. The time point T may be associated with a meeting window in which there is a large likelihood that the two nodes will be able to communicate. However, there are various ways in which the time points may be distributed in time so as to make an efficient IPSF and JUMP mode. In any case, the distribution of the Time points should be such that the intervals between time points generally reflects the average capacity fraction required in each piconet. A simple assumption could be to give an equal share to all the piconets coupled to a JUMP node; if there are three piconets present, simply give ⅓ of the capacity to each of the piconets. An alternative way is to let the capacity the JUMP node should get in each piconet, if they where fully utilized, reflect the allocation of time in each piconet. In any case, a number of exemplary approaches to time point distribution are provided below.

Figure 8A:
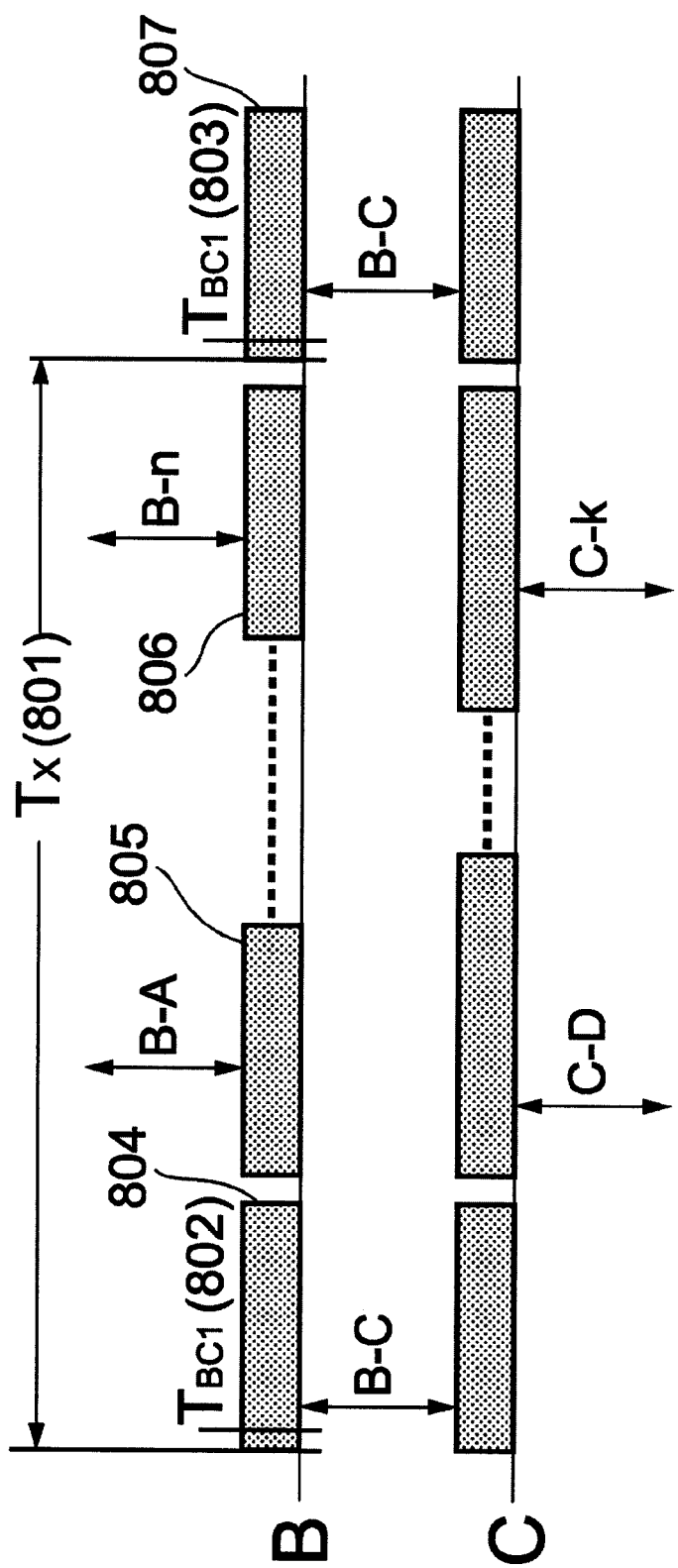
FIGS. 8A-8E each illustrates one of five exemplary time point methods for operating the ad-hoc network scatternet of FIG. 6 in JUMP mode to coordinate various communication sessions between the respective JUMP nodes.

A first approach is illustrated in FIG. 8A. In this approach, an overall interval $T_X$ 801 and distribute the time points $T_i$ in the different piconets within this interval $T_X$ 801. In this exemplary case, piconet connections B-C 804, B-A 805, through B-n 806 are initially the only piconet connection with node B 610 and are each allocated a time point within the overall time interval $T_X$ 801 that occurs in a communication cycle. If node B 610 would start participating in a new piconet the IPSF and JUMP mode would need to have a time point associated with this piconet inserted in this fixed interval $T_X$ of subsequent communication cycle periods. However, the interval between two consecutive time points of the same piconet, e.g., $T_{BC1}$ (802) and $T_{BC2}$ (803) of piconet A-B, would remain the same. In this manner, the communication cycle time and time between time points for the same piconets would be fixed from one communication cycle to the next regardless of the addition or deletion of another piconet. Only the individual communication session length would vary. Although, the overall time interval $T_X$ is a fixed interval, it can be renegotiated from time to time. Of course, if many piconets where connected to the same JUMP node then the overall time interval $T_X$ length could be set at a long time to provide reasonable communication session window lengths for all piconets. Similarly, if only a few piconets where coupled to a JUMP node, the overall time interval $T_X$ length could be set to a shorter time to not have extensive communication session window lengths for each of the piconets.

Figure 8B:
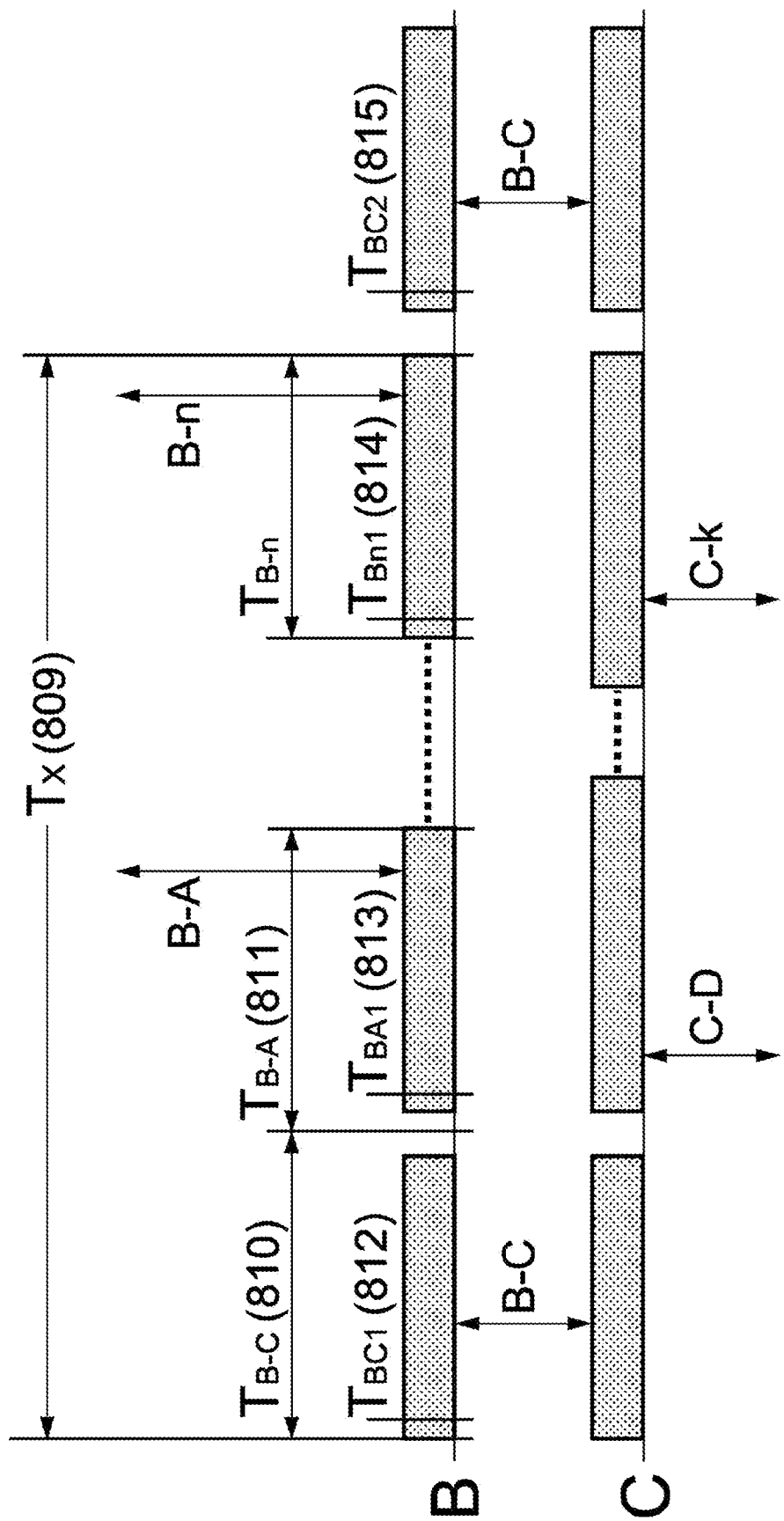

A second approach to time point distribution is illustrated in FIG. 8B. In this exemplary approach, distributing the time points may be arranged so as to keep the time interval constant between time points of different piconets. For example, the length of time from time point $T_{BC_1}$ 812 and $T_{BA_1}$ 813 (i.e., time interval $T_{B-C}$ 810) would remain the same regardless of the addition or subtraction of one or more piconets to JUMP node B 610. In this case, a newly added piconet would mean an increase of the time between successive time points of the same piconet, e.g., $T_{BC_1}$ to $T_{BC_2}$, since the new piconet is appended to the end of a communication cycle period $T_X$ 809 schedule. Similarly, the elimination of one or more piconets would result in a reduction in the time between successive time points of the same piconet.

Figure 8C:
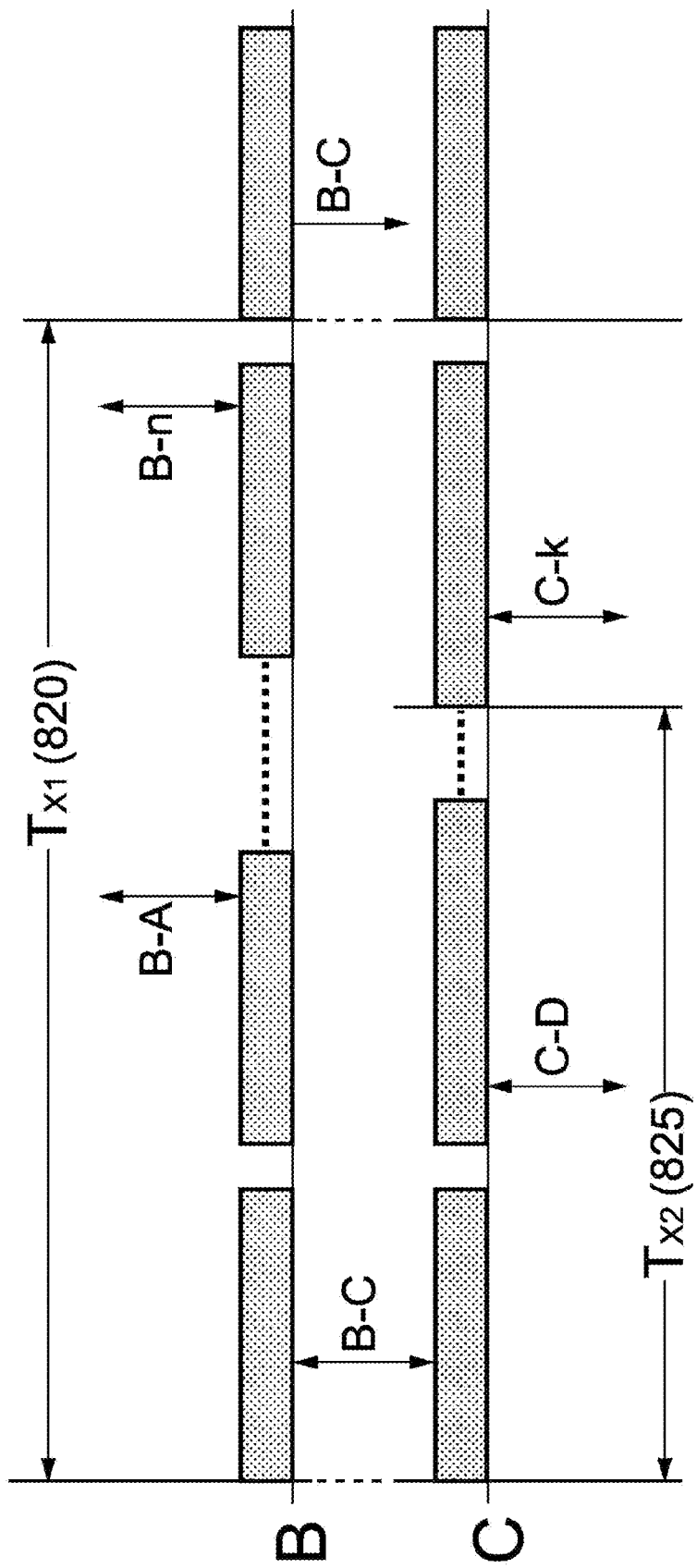

A third approach to time point distribution is illustrated in FIG. 8C. Using this approach the time points may be distributed in a manner that allows for different communication cycle periods on different links coupled to the same JUMP node. For example, the overall communication cycle period interval $T_{X_1}$ 820 for JUMP node B 610 may be longer than the overall communication cycle period interval $T_{X_2}$ 825 for JUMP node C 615, even though they must coordinate communication session between one another. In this case, $T_{X_1}$ 820=c×$T_{X_2}$ 825, where c is a constant This may introduce a risk for "collisions" between time points belonging to different piconets, but if a collision occurs the JUMP mode allows for the time point to be passed without disconnecting the link. If the collisions become excessive to the point of decreased efficiency, the constant c could be revised and the collisions thereby reduced. The occurrence of collisions depends also on the phase between the timepoints. If c is an integer there will be collisions every c×T×2 slots if the time points have the same phase. However, if the time points are shifted a number of slots from one another they will always miss and never collide. One advantage of the varied communication cycle periods on different links approach to time point distribution is that it may prove to be more efficient and flexible to have a mix of different delay constraints within the scatternet.

Figure 8D:
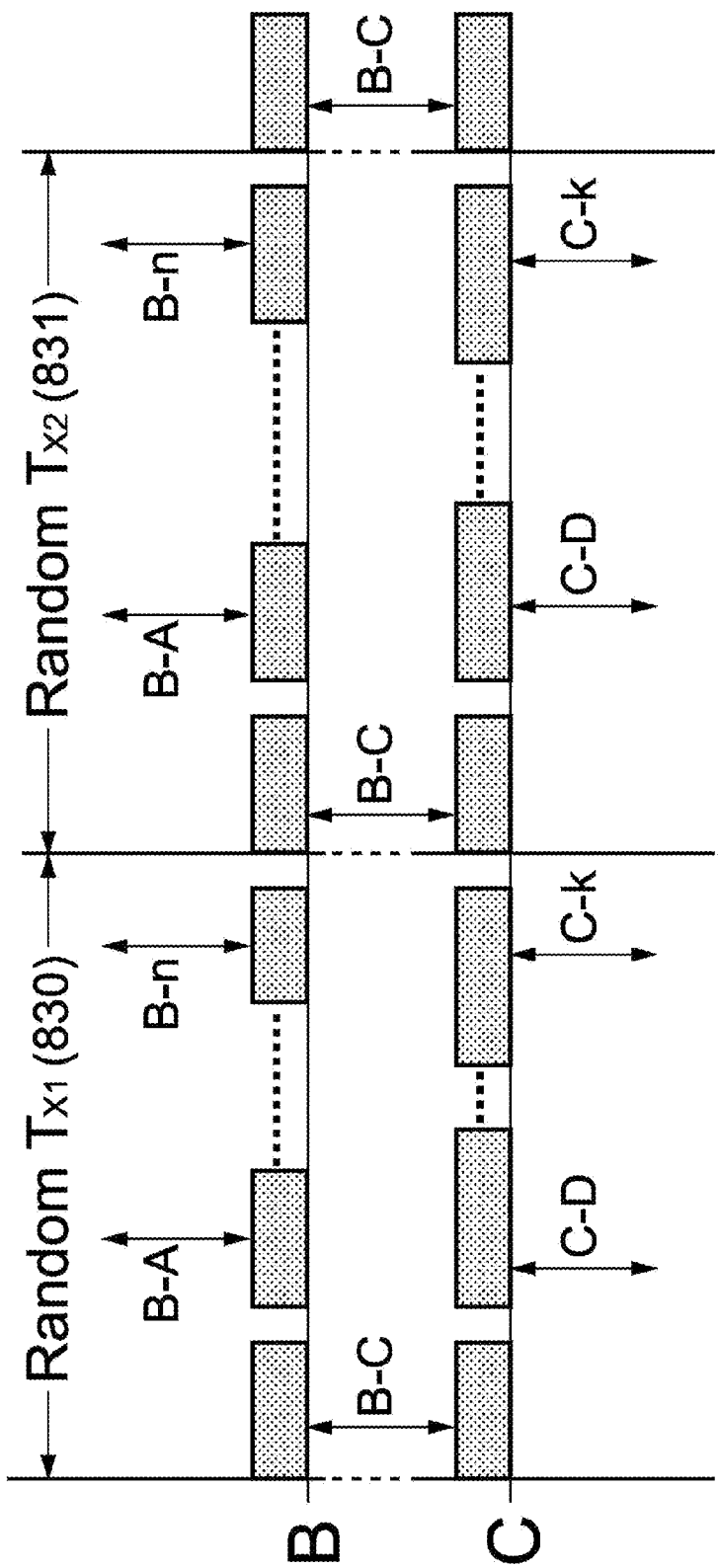

A fourth approach to time point distribution is illustrated in FIG. 8D. This approach spreading out the time points is to let the time interval between the time points be a random communication cycle time period. For example, a first communication cycle for JUMP node B 610 may have a relatively short period of time, $T_{X_1}$ 830, during a first cycle time. Next, the second communication cycle for JUMP node B 610 may have a relatively long period of time, $T_{X_2}$ 831. However, this approach may require that each of the nodes interrelated with the schedule of a JUMP node knows the random period. In one embodiment, each interrelated node may be provided with a common pseudo random sequence, e.g., similar to the frequency hopping sequence selection algorithm used by the piconet nodes for the FHSS. In one variation, the location of the various time points may be spread out randomly with a certain mean period. As with the previous way of distributing the time points, collisions of time points might occur. Although in this case, the potential collisions would in general be naturally resolved over time since the next time point is randomly picked. To minimize the risk of such collisions, the nodes might generate orthogonal random sequences. The probability for collision also depends on the mean period between time points and the number of piconets. In one variation, the various piconets of the scatternet may use different periods, since they are randomly relocated each time anyway. This approach may give better flexibility by providing a mix of different delay constraints within the scatternet.

Figure 8E:
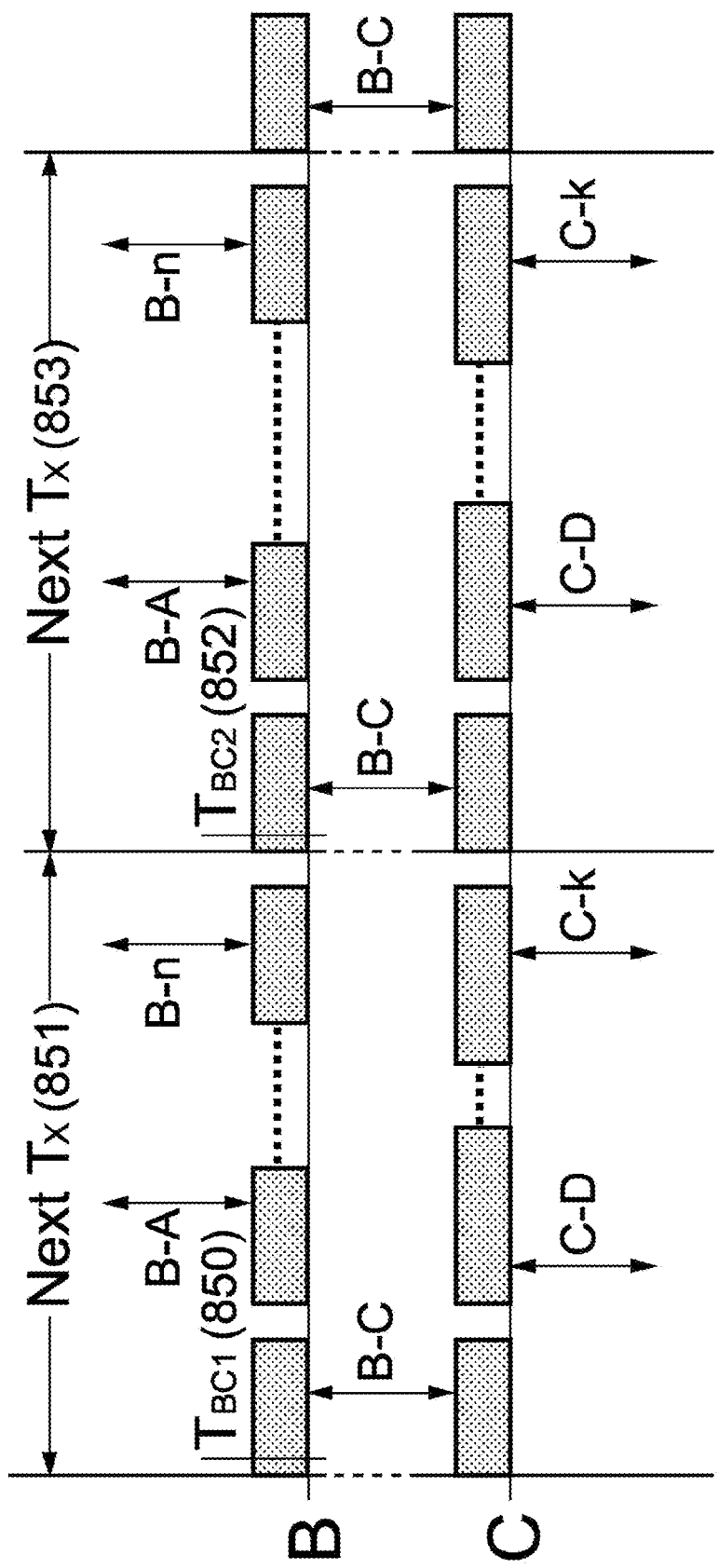

A fifth approach to time point distribution is illustrated in FIG. 8E. In this case there is no fixed or predetermined period for the communication cycles. Rather, the occurrence of the next time point for a pair of nodes is negotiated, determined, and updated during each communication session between the respective nodes. For example, time point $T_{BC_2}$ 852 may be determined and set during the earlier communication session including time point $T_{BC_1}$ 850 between node B 610 and node C 615. The agreed upon time may be completely independent of any particular communication cycle period $T_X$ 851 or $T_X$ 853 or length. The length of a communication cycle time period TX then is merely the result of cumulative time point coordination and agreement between the various nodes intercommunicating with a JUMP node.

It is clear from the five methods for time point distribution suggested above that many variations for time point distribution are possible. Further, a scatternet may use a combination of time point distributions for the same nodes or an assortment of approaches for the various nodes so as to produce the most efficient method for coordinating communications between its various piconets.

The information exchange between the various nodes involve in inter-piconet communication using the JUMP mode and the time point approach will in general be more lightweight than if a more precise window needs to be allocated and maintained. Basically the period of the time point and the time to the first time point may need to be exchanged in case periodic time points are used. Using a time point approach in which time points may also be renegotiated or randomly picked on a per exchange event basis will likely generate more overhead. Although, the random location approach described above would likely require a minimum of exchange since it may operate efficiently by exchanging only, for example, the start value of the random sequence generation. This would be similar to how the address is used to generate the hopping sequence in a piconet. In some variations of the invention, the decision to exceed data exchange beyond a time point may also need to be coordinated between the nodes that are sending data. However, this could be a piece of information that is sent in-band or a specific control packet. This raises the issue of how to manage the situation when a time point of another piconet is exceeded by the earlier communication session window of a first piconet.

Ideally a method should be devised to ensure that each piconet is fairly serviced by a JUMP node if there is data to be exchanged. One approach may be to provide a simple counter that may be incremented if a time point of a piconet is exceeded so as to indicate that that piconet has not received service for what ever number of communication cycles. The counter value may then be used to give higher priority for service the piconet having a higher counter value during the following occurrence of a time points for that piconet or the following communication cycle. In order to control the overall fairness, measurements or comparisons (e.g., counter value, time laps, amount of data awaiting transfer, etc.) may be used to decide if a time point may be passed or not.

Depending on the current activity levels in the piconets where a JUMP node is involved, the capacity fraction for the piconets may be updated. This means that the time points may be moved to reflect a new capacity distribution. The calculations to determine these changes may be based on measurements of both traffic load and buffer occupancy levels of the piconets the JUMP node is involved in surrounding the time points. As previously shown in FIG. 7B, the data exchange may be allowed to exceed beyond a time point for another piconet. This provides a high degree of traffic adaptivity to the time point approach.

As can be seen from the previous discussion, the present invention introduces a number of benefits for scatternet communication scheduling that may be used individually or in combination. The introduction of a new mode, JUMP mode, that defines the behavior of a PMP node may provide the IPSF a clean and consistent specification and enable new features for providing efficient scatternet operation. In variations using time points, it is easy for two nodes to agree on a time to initiate communication because the time point is typically shorter then a communication session. By allowing flexibility in the beginning and ending of a communication session, including allowing a data exchange to exceed beyond the time point established a communication session related to a different piconet, it is possible to handle temporary bursts of data without revising the inter-piconet schedule. Further, little or no information needs to be exchanged between a PMP and its directly connected nodes to enable those nodes to determine the absolute timing of the PMPs time points. Finally, by moving the time points it is possible to dynamically adapt to varying traffic demands in different piconets.

Although particular embodiments of the present invention have been shown and described, it will be understood that it is not intended to limit the invention to the preferred embodiments disclosed herein and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims. For example, another approach to providing flexible inter-piconet scheduling for IPSF and/or the JUMP mode may be to adjust the communication session and/or meeting window length based on probabilities derived from a history of traffic patterns so as to allocate communication time and frequency based on need. In this case, the system could monitor the traffic of data between the various piconets and set up or calculate an historical probability that a given piconet will need or try to communicate with a shared node (i.e. a jump node). In one variation, a maximum amount of communication time may be set for a given piconet. In another variation, a maximum amount of data may be set and monitored so that the maximum amount of data is reached the node switches to another piconet. Finally, although the present invention has been describe as being introduced with a new specific mode, the JUMP mode, one skilled in the art will recognize that the invention may be implemented as a sub-mode of one of the presently available operating modes of Bluetooth, e.g., as a sub-mode of one of the power save modes.

What is claimed is:

1. A method for coordinating inter-network communications between at least two networks, comprising the step of:
providing a specific mode or sub-mode that defines the behavior of a node common to said at least two networks as being a node shared by said at least two networks, wherein the specific mode or sub-mode indicates that said node should not be disconnected from said at least two networks even though it has not participated in said scheduled inter-network communication sessions.

2. The method of claim 1, further comprising the step of:
coordinating scheduling of inter-network communications between the at least two networks using a window, a time point, or a random inter-network communication scheduling approach.

3. The method of claim 2, wherein the scheduling of inter-network communications includes the time point approach, and the time point approach includes a flexible start time for a communication session between the at least two networks.

4. The method of claim 3, wherein the flexible start time includes a time point and a meeting window, and the meeting window has a probability of inter-network communication occurring at any particular point in the meeting window.

5. The method of claim 4, wherein said communication session starts during said flexible start time and continues for any length of time depending on the amount of information needed to be exchanged by said two or more networks.

6. The method of claim 5, wherein said time points are distributed over time using an approach selected from: (1) constant communication cycle period length, (2) constant time intervals between time points of different networks, (3) different communication cycle period lengths on different communication links to said node, (4) random spreading of said time points; and (5) next time point scheduled during each of the communication sessions.

7. The method of claim 1, wherein said at least two networks are ad-hoc networks.

8. An inter-network communication system, comprising:
a first network:
a second network coupled to the first network:
a node shared by said first network and said second network; and
a specific mode or sub-mode that defines behavior of the node as being shared by the first network and the second network,
wherein the specific mode or sub-mode indicates that said node should not be disconnected from said at least two networks even though it has not participated in said scheduled inter-network communication sessions.

9. The system of claim 8, further comprising:
an inter-network scheduling function that coordinates scheduling of inter-network communications between the at least two networks using a window, a time point, or a random approach.

10. The system of claim 9, wherein the inter-network scheduling function includes the time point approach, and the time point approach includes a flexible start time for a communication session between the first network and the second network.

11. The system of claim 10, wherein the flexible start time includes a time point and a meeting window, and the meeting window has a probability of inter-network communication occurring at any particular point in the meeting window.

12. The system of claim 11, wherein said communication session starts during said flexible start time and continues for any length of time depending on the amount of information needed to be exchanged by the first network and the second network.

13. The system of claim 12, wherein said time points are distributed over time using an approach selected from: (1) constant communication cycle period length, (2) constant time intervals between time points of different networks, (3) different communication cycle period lengths on different communication links to said node, (4) random spreading of said time points; and (5) next time point scheduled during each of the communication sessions.

14. The system of claim 8, wherein the first network and the second network are ad-hoc networks.

15. A node for use in an ad-hoc communication system, the node comprising:
an intra-piconet scheduler;
a link manager; and
an inter-piconet scheduler communicatively coupled to the intra-piconet scheduler, and communicatively coupled to the link manager, the inter-piconet scheduler comprising:
logic that exchanges active piconet information and/or active slave information with the intra-piconet scheduler; and logic that exchanges link mode set-up information, timing parameters, and/or correlation window control information with the link manager,
wherein the link mode set-up information indicates whether the node is shared between at least two piconets.

16. The node of claim 15, comprising:
logic that causes the node to skip a scheduled inter-piconet communication session.

17. The node of claim 15, comprising:
logic that detects that another node has skipped a scheduled inter-piconet communication session with the node and in response to said detection maintains a connection with said another node.

* * * * *